(12) United States Patent
Suneya

(10) Patent No.: US 8,566,662 B2
(45) Date of Patent: Oct. 22, 2013

(54) TRANSMISSION APPARATUS, RECEIVING APPARATUS, AND METHOD

(75) Inventor: Toru Suneya, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 934 days.

(21) Appl. No.: 12/492,075

(22) Filed: Jun. 25, 2009

(65) Prior Publication Data

US 2009/0327844 A1 Dec. 31, 2009

(30) Foreign Application Priority Data

Jun. 27, 2008 (JP) ................................. 2008-169329

(51) Int. Cl.
*H03M 13/35* (2006.01)
*H04L 1/16* (2006.01)

(52) U.S. Cl.
USPC ............................ 714/751; 714/774; 714/776

(58) Field of Classification Search
USPC ......................................... 714/751, 774, 776
See application file for complete search history.

(56) References Cited

U.S. PATENT DOCUMENTS

| 7,876,685 B2 * | 1/2011 | Botzko et al. ................. 370/235 |
| 7,995,462 B2 * | 8/2011 | Gao et al. ....................... 370/216 |
| 2005/0160346 A1 * | 7/2005 | Yamane ......................... 714/776 |
| 2009/0271681 A1 * | 10/2009 | Piret et al. ...................... 714/749 |
| 2010/0005360 A1 * | 1/2010 | Begen et al. ................... 714/751 |

FOREIGN PATENT DOCUMENTS

| CN | 1638321 A | 7/2005 |
| CN | 1642067 A | 7/2005 |
| CN | 101043296 A | 9/2007 |
| JP | 2001-160824 | 6/2001 |

OTHER PUBLICATIONS

"TCP Friendly Rate Control (TFRC): Protocol Specification" RFC 3448, Jan. 2003.

* cited by examiner

*Primary Examiner* — Stephen M Baker
(74) *Attorney, Agent, or Firm* — Canon USA Inc. IP Division

(57) ABSTRACT

An error pattern analysis unit specifies positions of discarded packets in continuously transmitted groups of packets. A QoS control unit estimates the cause of a communication error based on the specified positions of discarded packets, and performs QoS control based on the estimated cause of the communication error.

21 Claims, 8 Drawing Sheets

$$T_{TCP} \neq \frac{MTU}{RTT\sqrt{2p/3} + T_o(3\sqrt{3p/8})p(1+32p^2)}$$

$T_o$: TIME-OUT PERIOD
$p$: PACKET LOSS RATE

TRANSMISSION APPARATUS, RECEIVING APPARATUS, AND METHOD

BACKGROUND OF THE INVENTION

1. Field of the Invention

The present invention relates to a wired or wireless network communication technique.

2. Description of the Related Art

In current advanced communication systems, data requiring a relatively large data communication band, for example, moving image data, is generally transmitted/received via a communication line such as the Internet.

In such transmission of moving image data requiring real-time communication, a protocol that does not compensate for a communication error, for example, RTP (Real-time Transport Protocol), is sometimes used.

In a case that sound data and moving image data are transmitted using such a protocol that does not compensate for a communication error, the prevention of occurrence of a communication error and the correction of a communication error are generally performed using a QoS (Quality of Service) technique. That is, the control of a transmission rate (rate control) is performed in accordance with a network status, the retransmission control of a communication error packet is performed, and the correction of a communication error is performed using an FEC (Forward Error Correction) technique.

A method of controlling QoS in accordance with the changes in a packet loss rate and RTT (Round Trip Time) is known. For example, Japanese Patent Laid-Open No. 2001-160824 discloses a method of reducing a data transfer rate in a case that a packet loss rate is higher than a threshold value and an RTT value is larger than the minimum RTT value stored in advance.

An example of a rate control method using a packet loss rate and RTT is disclosed in M. Handley et al., "TCP Friendly Rate Control (TFRC): Protocol Specification" RFC 3448, January 2003.

In TFRC (TCP Friendly Rate Control), an available network band is calculated using an equation illustrated in FIG. 10.

In the equation illustrated in FIG. 10, Ttcp represents an available network band to be calculated, MTU (Maximum Transfer Unit) represents the maximum size of a transmitted packet, To represents a time-out period that is the maximum waiting period before a TCP reception acknowledgement (Ack) is transmitted, and p represents a packet loss rate in 1 RTT. That is, an available band is calculated using a packet loss rate and RTT, and the calculation result is used to control a communication rate.

However, a communication error is caused by various factors. Accordingly, in some cases, QoS control may not be appropriately performed using a method in the related art.

That is, for example, a communication error is caused not only by congestion but also by noise (disturbance). The change in RTT is also caused not only by congestion but also by another factor, for example, the change in load on a receiving apparatus or a route change on a network.

If data is transmitted via a plurality of communication nodes, for example, a communication node where an error occurs and a communication node where a delay occurs may differ from each other.

That is, in some cases, the cause of a communication error occurring on a network cannot be specified using RTT and a packet loss rate. For example, even if a transfer rate is reduced in accordance with RTT and a packet loss rate when a communication error is caused by noise, the packet loss rate may not be reduced. For example, even if the number of FEC packets is increased in accordance with RTT and a packet loss rate when a communication error is caused by congestion, the amount of communication is increased and a packet loss rate may not be reduced.

That is, even if QoS control is performed in accordance with RTT and a packet loss rate obtained from a communication partner, the QoS control may not be appropriately performed.

SUMMARY OF THE INVENTION

An embodiment of the present invention provides a wired or wireless network communication technique capable of specifying the cause of a communication error occurring on a network.

Another embodiment of the present invention provides a wired or wireless network communication technique capable of appropriately performing QoS control based on the cause of a communication error.

According to an embodiment of the present invention, there is provided a transmission apparatus for sequentially transmitting a plurality of packets to a communication partner. The transmission apparatus includes: a transmission control unit configured to set a waiting period between transmission of a certain group of packets and transmission of a next group of packets, a reception unit configured to receive from the communication partner reception information representing a packet reception status, and a setting unit configured to specify a position of each error packet in a group based on the reception information, and set at least one of the number of packets in each group and the number of pieces of correction data to be transmitted to the communication partner to allow the communication partner to correct an error included in received packets using it based on the specified position of the error packet.

According to an embodiment of the present invention, there is provided a transmission method of sequentially transmitting a plurality of packets to a communication partner. The transmission method includes: setting a waiting period between transmission of a certain group of packets and transmission of a next group of packets, receiving from the communication partner reception information representing a packet reception status, and specifying a position of each error packet in a group based on the reception information, and setting at least one of the number of packets in each group and the number of pieces of correction data to be transmitted to the communication partner to allow the communication partner to correct an error included in received packets using it based on the specified position of the error packet.

According to an embodiment of the present invention, there is provided a computer-readable medium storing computer-executable instructions for causing a computer to perform a method of sequentially transmitting a plurality of packets to a communication partner. The method includes: setting a waiting period between transmission of a certain group of packets and transmission of a next group of packets, receiving from the communication partner reception information representing a packet reception status, and specifying a position of each error packet in a group based on the reception information, and setting at least one of the number of packets in each group and the number of pieces of correction data to be transmitted to the communication partner to allow the communication partner to correct an error included in received packets using it based on the specified position of the error packet.

According to an embodiment of the present invention, there is provided a transmission apparatus for sequentially transmitting a plurality of packets to a communication partner via a network. The transmission apparatus includes: a transmission control unit configured to set a waiting period between transmission of a certain group of packets and transmission of a next group of packets, a reception unit configured to receive from the communication partner reception information representing a packet reception status, and a determination unit configured to specify positions of error packets in a plurality of continuously transmitted groups of packets based on the reception information, determine whether the positions of the error packets are corresponding positions in the plurality of continuously transmitted groups, and detect a status of the network based on a determination result.

According to an embodiment of the present invention, there is provided a receiving apparatus for receiving from a transmission apparatus via a network a plurality of packet groups between which a transmission waiting period is set. The receiving apparatus includes: an acquisition unit configured to acquire, from each of received packets, identification information identifying a position of the packet in a packet group, a determination unit configured to specify positions of network error packets in a plurality of packet groups continuously transmitted from the transmission apparatus based on the acquired identification information, determine whether the specified positions are corresponding positions in the plurality of packet groups, and detect a status of the network based on a determination result, and a notification unit configured to notify the transmission apparatus of the detected status of the network.

According to an embodiment of the present invention, there is provided a transmission method of sequentially transmitting a plurality of packets to a communication partner via a network. The transmission method includes: setting a waiting period between transmission of a certain group of packets and transmission of a next group of packets, receiving from the communication partner reception information representing a packet reception status, and specifying positions of error packets in a plurality of continuously transmitted groups of packets based on the reception information, determining whether the positions of the error packets are corresponding positions in the plurality of continuously transmitted groups, and detecting a status of the network based on a determination result.

According to an embodiment of the present invention, there is provided a computer-readable medium storing computer-executable instructions for causing a computer to perform a method of sequentially transmitting a plurality of packets to a communication partner via a network. The method includes: setting a waiting period between transmission of a certain group of packets and transmission of a next group of packets, receiving from the communication partner reception information representing a packet reception status, and specifying positions of error packets in a plurality of continuously transmitted groups of packets based on the reception information, determining whether the positions of the error packets are corresponding positions in the plurality of continuously transmitted groups, and detecting a status of the network based on a determination result.

According to an embodiment of the present invention, there is provided a processing method performed by a receiving apparatus for receiving from a transmission apparatus via a network a plurality of packet groups between which a transmission waiting period is set. The processing method includes: acquiring, from each of received packets, identification information identifying a position of the packet in a packet group, specifying positions of network error packets in a plurality of packet groups continuously transmitted from the transmission apparatus based on the acquired identification information, determining whether the specified positions are corresponding positions in the plurality of packet groups, and detecting a status of the network based on a determination result, and notifying the transmission apparatus of the detected status of the network.

According to an embodiment of the present invention, there is provided a computer-readable medium storing computer-executable instructions for causing a computer to perform a method of receiving from a transmission apparatus via a network a plurality of packet groups between which a transmission waiting period is set. The method includes: acquiring, from each of received packets, identification information identifying a position of the packet in a packet group, specifying positions of network error packets in a plurality of packet groups continuously transmitted from the transmission apparatus based on the acquired identification information, determining whether the specified positions are corresponding positions in the plurality of packet groups, and detecting a status of the network based on a determination result, and notifying the transmission apparatus of the detected status of the network.

Further features of the present invention will become apparent from the following description of exemplary embodiments with reference to the attached drawings.

DESCRIPTION OF THE EMBODIMENTS

Figure 1:
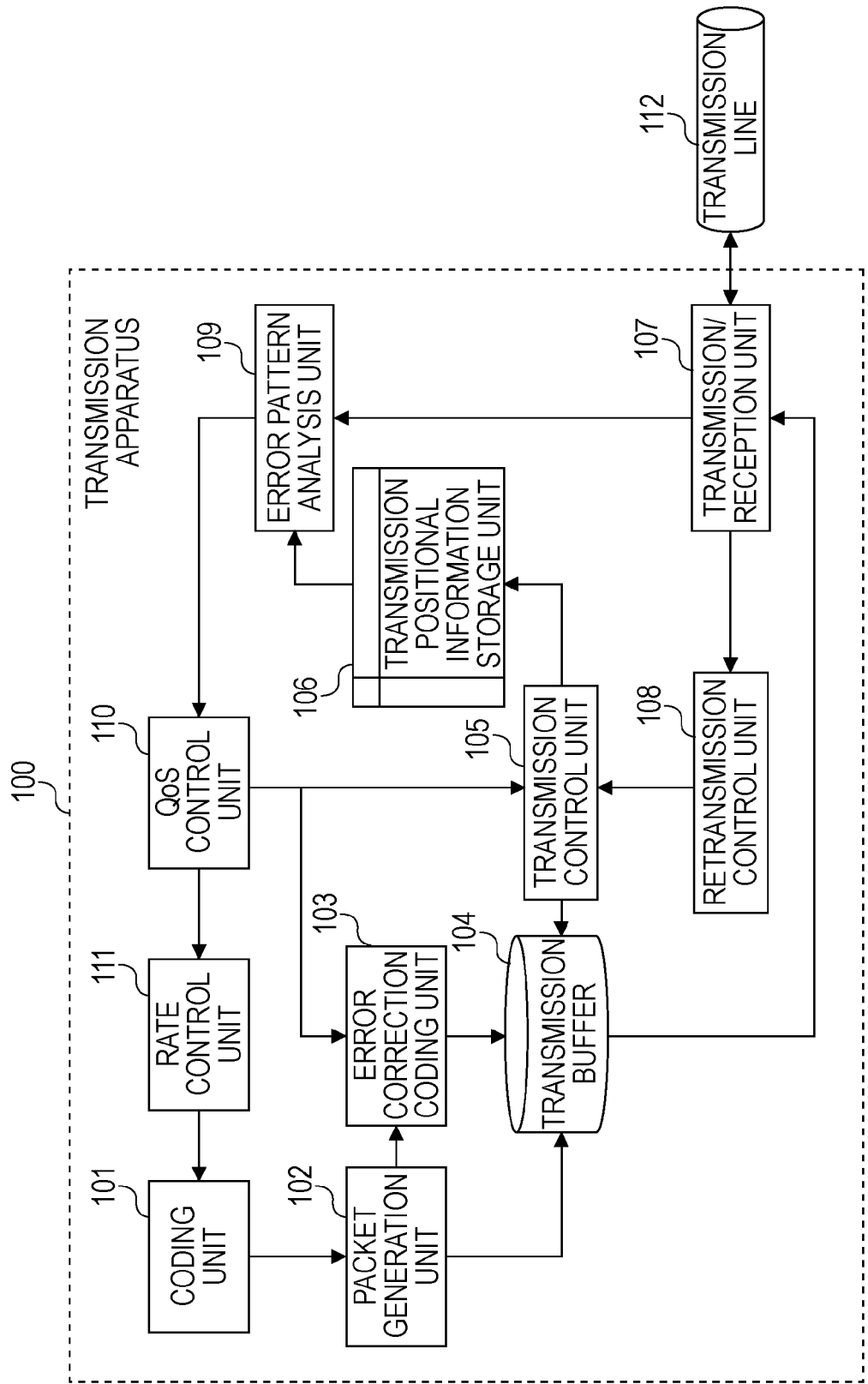
FIG. 1 is a block diagram illustrating a basic configuration of a transmission apparatus.

FIG. 1 is a block diagram illustrating a basic configuration of a transmission apparatus according to a first embodiment of the present invention. A transmission apparatus 100 is an apparatus capable of sequentially transmitting a plurality of packets to a communication partner (receiving apparatus), for example, a personal computer, a workstation, a notebook PC, a palmtop PC, a home appliance containing a computer, a game machine, a mobile telephone, a digital video camera, or a digital camera. Alternatively, the transmission apparatus 100 may be composed of the combination of the above-described apparatuses.

As illustrated in FIG. 1, the transmission apparatus 100 includes a coding unit 101, a packet generation unit 102, an error correction coding unit 103, a transmission buffer 104, a transmission control unit 105, a transmission positional information storage unit 106, a transmission/reception unit 107, a retransmission control unit 108, an error pattern analysis unit 109, a QoS control unit 110, and a rate control unit 111.

The coding unit 101 compresses the amount of data by coding a moving image or sound data on the basis of a coding rate such as MPEG (Moving Picture Experts Group)-4 instructed by the rate control unit 111. The method of compressing moving image data is not limited to MPEG-4, and another coding method such as MPEG-2 or H.264 (MPEG-4 AVC) may be used.

For example, if the RTP protocol is used for communication, the packet generation unit 102 divides the data coded by the coding unit 101 into pieces of a size suitable for communication and adds a header required for communication to each of these pieces so as to generate RTP data packets.

The error correction coding unit 103 generates an error correction packet (hereinafter referred to as an FEC packet) from the data packets generated by the packet generation unit 102 on the basis of redundancy instructed by the QoS control unit 110 to be described later. The FEC packet is data to be transmitted to a communication partner (receiving apparatus) so as to allow the communication partner to correct an error included in received packets using it. The redundancy represents the ratio of the number of FEC packets to the number of data packets.

The data packets generated by the packet generation unit 102 and the FEC packet generated by the error correction coding unit 103 are temporarily stored in the transmission buffer 104.

The data packets and the FEC packet, which are temporarily stored in the transmission buffer 104, are transmitted from the transmission/reception unit 107 to a transmission line 112 in accordance with a transmission sequence and a transmission time determined by the transmission control unit 105.

In this embodiment, the transmission line 112 is a network for transmitting a packetized moving image, packetized sound data, and error correction data.

The transmission control unit 105 determines the transmission sequence of packets and the transmission time of the packets in accordance with an instruction transmitted from the QoS control unit 110, and stores information about transmitted packets in the transmission positional information storage unit 106. The information about transmitted packets will be described later. The transmission control unit 105 determines the transmission sequence of packets to be retransmitted and the transmission time of the packets in accordance with a retransmission instruction transmitted from the retransmission control unit 108 to be described later. As illustrated in a packet transmission state 507 in FIG. 5, the transmission control unit 105 continuously transmits a plurality of packets. The transmission control unit 105 continuously transmits groups of packets at intervals.

That is, the transmission control unit 105 sets a waiting period between the transmission of a certain group of packets and the transmission of the next group of packets.

The transmission/reception unit 107 has functions of transmitting packets stored in the transmission buffer 104 and receiving packets transmitted from the transmission line 112. For example, the packets received by the transmission/reception unit 107 include a packet (reception information packet) for notifying the transmission apparatus 100 of the reception status of packets in a receiving apparatus.

That is, the transmission/reception unit 107 receives reception information (the reception information packet) representing the reception status of packets from a communication partner (receiving apparatus).

Upon receiving the reception information packet, the transmission/reception unit 107 notifies the error pattern analysis unit 109 of the reception information.

For example, the packets received by the transmission/reception unit 107 include a packet (retransmission request packet) for requesting retransmission of a packet discarded on the communication path and a bit-error packet (discarded packet). Upon receiving the retransmission request packet, the transmission/reception unit 107 notifies the retransmission control unit 108 of information about the retransmission request packet.

Upon receiving the information about the retransmission request packet from the transmission/reception unit 107, the retransmission control unit 108 instructs the transmission control unit 105 to retransmit a packet.

The error pattern analysis unit 109 specifies the positions of discarded packets in continuously transmitted groups of packets on the basis of the reception information transmitted from the transmission/reception unit 107 and the packet transmission positional information stored in the transmission positional information storage unit 106. The error pattern analysis unit 109 analyzes the pattern of a communication error on the basis of the specified positions of discarded packets. The reception information includes pieces of identification information (sequence numbers) of the discarded packets.

That is, the error pattern analysis unit 109 specifies the position of an error packet (discarded packet) in a group of packets on the basis of the reception information.

The error pattern analysis unit 109 notifies the QoS control unit 110 of the analysis result of the error pattern. The details of error pattern analysis processing will be described later.

The QoS control unit 110 performs the setting of redundancy for the error correction coding unit 103, the settings of the number of packets included in each group and a transmission interval between groups for the transmission control unit 105, and the setting of a coding rate for the rate control unit 111. The QoS control unit 110 sets the number of data packets included in each group as the coding rate for the rate control unit 111.

The QoS control unit 110 performs the following setting processing on the basis of the positions of error packets. That is, the QoS control unit 110 performs at least one of the settings of the number of packets included in each group and the number of pieces of data to be transmitted to a communication partner (receiving apparatus) so as to allow the communication partner to correct an error included in received packets using it.

The headers (RTP headers) of RTP packets transmitted from the transmission/reception unit 107 are sequentially numbered in ascending order.

Figure 11:
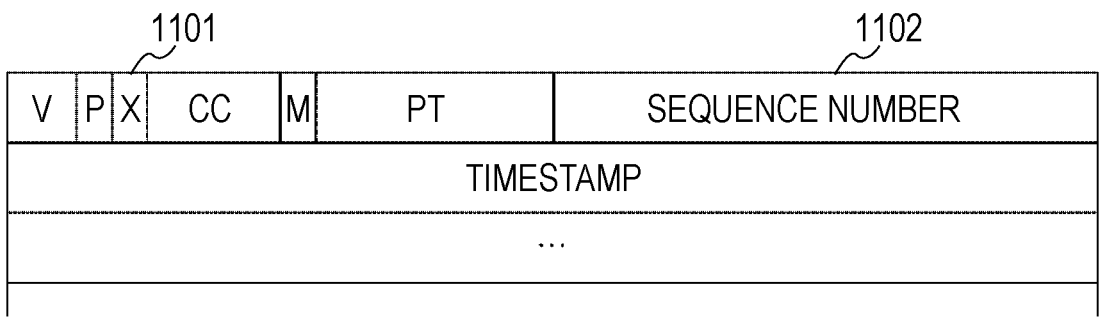
FIG. 11 is a diagram illustrating the format of an RTP header.

FIG. 11 is a diagram illustrating the format of an RTP header. Referring to FIG. 11, a sequence number 1102 represents one of the above-described numbers sequentially assigned to packets in ascending order. The width of the sequence number 1102 is 16 bits. A receiving apparatus can determine whether a packet has bee discarded on the communication path by monitoring whether there is a dropout in the sequence numbers of received packets.

Next, the error pattern analysis processing performed by the error pattern analysis unit 109 will be described. First, the details of the reception information transmitted from the transmission/reception unit 107 to the error pattern analysis unit 109 will be described.

Figure 4:
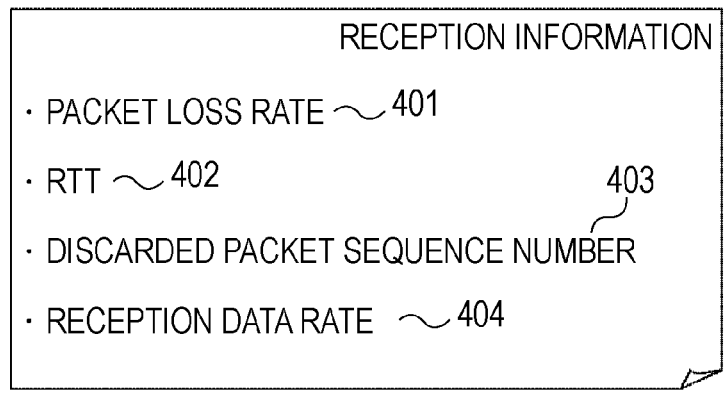
FIG. 4 is a diagram illustrating an example of reception information transmitted from a receiving apparatus to the transmission apparatus illustrated in FIG. 1.

FIG. 4 illustrates an example of the reception information included in the reception information packet that is transmitted from a receiving apparatus to the transmission apparatus 100 and is then transmitted from the transmission/reception unit 107 to the error pattern analysis unit 109.

A packet loss rate 401 illustrated in FIG. 4 represents the percentage of packets discarded on the communication path and bit-error packets (discarded packets) to transmitted packets. An RTT 402 represents the time taken by a packet to travel between the transmission apparatus 100 and a receiving apparatus. The RTT 402 may be pieces of information about the time taken by packets transmitted from the transmission apparatus 100 to reach the receiving apparatus and the transmission time of the reception information packet. In this case, upon receiving the reception information packet, the transmission apparatus 100 can calculate the time taken by the packet to travel between the transmission apparatus 100 and the receiving apparatus on the basis of the above-described two pieces of information and the reception time of the reception information packet.

A discarded packet sequence number 403 represents the sequence numbers of the packet discarded on the communication path and the bit-error packet (discarded packet). The discarded packet sequence number 403 corresponds to the sequence number 1102 included in the RTP header described previously with reference to FIG. 11. That is, the error pattern analysis unit 109 can specify the packet discarded on the communication path and the bit-error packet by referring to the discarded packet sequence number 403. A reception data rate 404 represents the bit rate of packets correctly received by the receiving apparatus.

The error pattern analysis unit 109 according to this embodiment uses the discarded packet sequence number 403 illustrated in FIG. 4 so as to analyze a communication error pattern.

Next, an example of the packet transmission positional information 500 stored in the transmission positional information storage unit 106 will be described with reference to FIG. 5.

Figure 5:
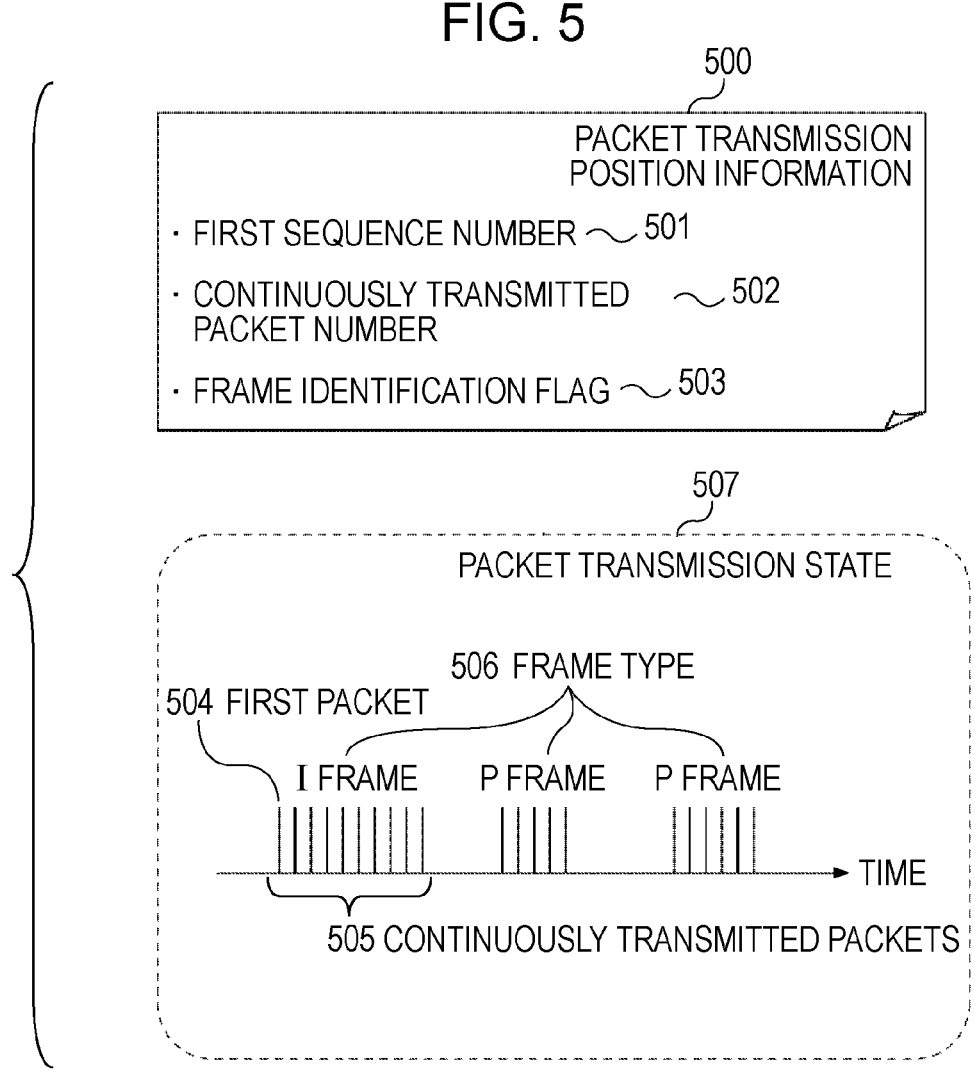
FIG. 5 is a diagram illustrating an example of transmission positional information stored in a transmission positional information storage unit.

Referring to FIG. 5, the packet transmission state 507 represents a state in which pieces of packetized frame data are continuously transmitted on a frame-by-frame basis. In this embodiment, transmission packets are grouped on a frame-by-frame basis and are then continuously transmitted. However, the transmission packets may be grouped in arbitrary units of, for example, slice or a plurality of frames and then be continuously transmitted. The transmission interval between the last packet in a certain group and the first packet in the next group is longer than the transmission intervals between packets in the same group.

A first sequence number 501 represents a sequence number recoded in an RTP header of a first packet 504 that is one of continuously transmitted packets 505 in the packet transmission state 507. That is, the first sequence number 501 represents a sequence number of a packet to be first transmitted in each group. A continuously transmitted packet number 502 represents the number of the continuously transmitted packets 505. That is, the continuously transmitted packet number 502 represents the number of packets in each group. A frame identification flag 503 represents a flag identifying a frame type 506 representing the type of the coding method of a packetized frame. Examples of the frame type 506 include I frame (Intra frame), P frame (Predictive frame), and B frame (Bidirectionally predictive frame). The error pattern analysis unit 109 according to this embodiment uses the first sequence number 501 and the continuously transmitted packet number 502, which are illustrated in FIG. 5, to analyze a communication error pattern.

That is, the error pattern analysis unit 109 according to this embodiment refers to the discarded packet sequence number 403 obtained from the reception information packet, and the first sequence number 501 and the continuously transmitted packet number 502 which are stored in the transmission positional information storage unit 106 so as to analyze a communication error pattern. The transmission positional information storage unit 106 stores the first sequence number 501 of a first packet in each group (each frame) and the continuously transmitted packet number 502 in each group (each frame). If data communication is performed via a communication line such as the Internet, a packet loss is caused by various factors. However, one of representative causes of a packet loss is congestion in a network band.

If the number of packets passing through a communication apparatus such as a hub or router included in a network increases rapidly for a relatively short period due to the congestion in a network band, a buffer used for packet processing runs out of capacity and a packet loss occurs.

Next, the communication error pattern analysis processing performed by the error pattern analysis unit 109 will be described with reference to FIGS. 2 and 3.

Figure 2:
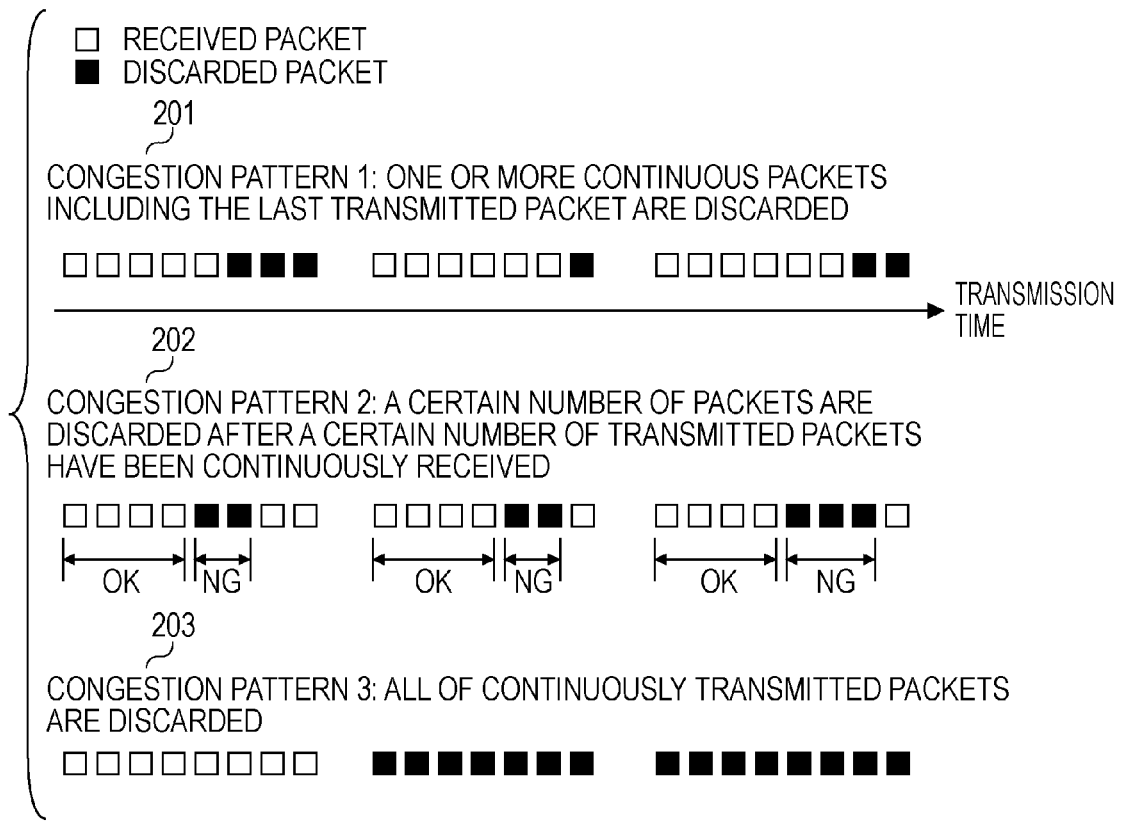
FIG. 2 is a diagram illustrating error patterns caused by congestion.
Figure 3:
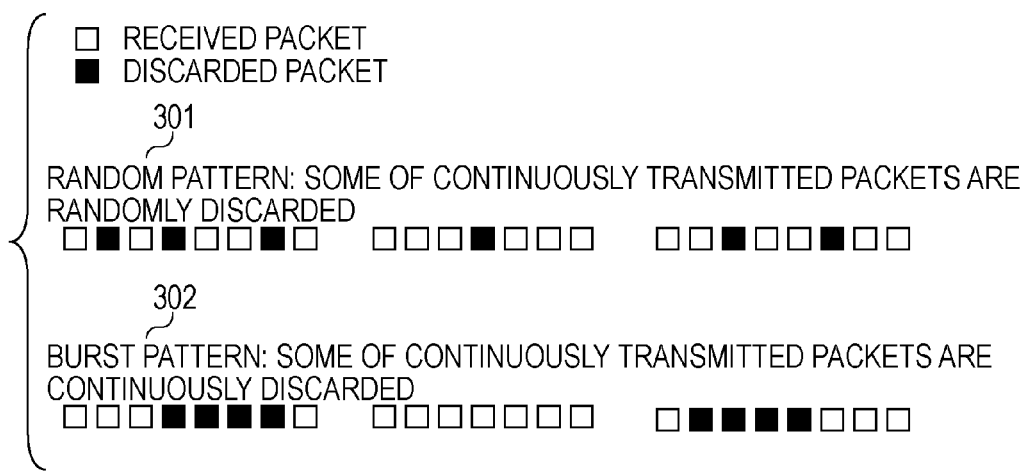
FIG. 3 is a diagram illustrating error patterns caused by another factor other than congestion.

Referring to FIGS. 2 and 3, □ represents a packet correctly received by the receiving apparatus, and ■ represents a packet discarded on the communication path or a bit-error packet (discarded packet). The error pattern analysis unit 109 can specify the transmission position on the time axis of a correctly received packet or a discarded packet on the basis of the discarded packet sequence number 403, the first sequence number 501, and the continuously transmitted packet number 502. That is, the error pattern analysis unit 109 can specify the position of a discarded packet in a group. In this embodiment, as described previously, a group denotes one of continuously transmitted groups of packets.

For example, if the error pattern analysis unit 109 specifies the position of a certain discarded packet in a group, the error pattern analysis unit 109 refers to the discarded packet sequence number 403 included in the reception information and retrieves a group including a packet having the discarded packet sequence number 403. As described previously, the transmission positional information storage unit 106 stores the first sequence number 501 and the continuously transmitted packet number 502 of each of transmitted groups of packets. Thus, the error pattern analysis unit 109 can specify a transmitted group including the discarded packet. Subsequently, the error pattern analysis unit 109 can specify the position of the discarded packet in a group on the basis of the continuously transmitted packet number 502 and the difference between the first sequence number of the specified group and the discarded packet sequence number 403. However, a method of specifying the position of a discarded packet in a group which is performed by the error pattern analysis unit 109 is not limited to the above-described method.

FIG. 2 is a diagram illustrating the position of a discarded packet in a group. For example, FIG. 2 illustrates an exemplary case in which pieces of packetized moving image data are continuously transmitted on a frame-by-frame basis. As described previously, the number of transmission packets in each group varies in accordance with, for example, the type of a frame.

Referring to FIG. 2, a congestion pattern 1 (201) represents a pattern in which one or more continuous packets including the last packet are discarded in each of continuously transmitted groups.

If this error pattern occurs a predetermined number of times or more for a predetermined period (or in a predetermined number of groups), the error pattern analysis unit 109 determines that a packet loss has occurred due to congestion (the congestion pattern 1). If this error pattern occurs in a predetermined number of continuous groups or more, the error pattern analysis unit 109 determines that a packet loss has occurred due to congestion (the congestion pattern 1). That is, if the last packet is an error packet in each of a plurality of continuously transmitted groups, the error pattern analysis unit 109 determines that congestion (the congestion pattern 1) occurs.

A congestion pattern 2 (202) represents a pattern in which a certain number of continuous packets are discarded after a certain number of continuous packets including the first packet have been correctly received in each group. In the congestion pattern 2 (202), the certain number of correctly received packets or discarded packets varies. There is no correlation between the number of received packets and the number of discarded packets.

If this error pattern occurs a predetermined number of times or more for a predetermined period (or in a predetermined number of groups), the error pattern analysis unit 109 determines that a packet loss has occurred due to congestion (the congestion pattern 2). If this error pattern occurs in a predetermined number of continuous groups or more, the error pattern analysis unit 109 determines that a packet loss has occurred due to congestion (the congestion pattern 2). That is, if a packet transmitted after a predetermined number of continuous packets including the first packet have been transmitted is an error packet in each of continuously transmitted groups, the error pattern analysis unit 109 determines that congestion (the congestion pattern 2) occurs.

A congestion pattern 3 (203) represents a pattern in which all of packets included in each group are discarded. If this error pattern occurs a predetermined number of times or more for a predetermined period (or in a predetermined number of groups), the error pattern analysis unit 109 determines that a packet loss has occurred due to congestion (the congestion pattern 3). If this error pattern occurs in a predetermined number of continuous groups or more, the error pattern analysis unit 109 determines that a packet loss has occurred due to congestion (the congestion pattern 3). In the congestion pattern 3 according to this embodiment, all of packets included in each group are discarded. However, if a predetermined percentage of packets or more to packets included in each group are discarded, the error pattern analysis unit 109 may determine that the congestion pattern 3 has occurred. That is, if a predetermined percentage of packets or more to packets included in each of continuously transmitted groups are error packets, the error pattern analysis unit 109 determines that congestion (the congestion pattern 3) occurs. As described previously, if a packet loss occurs in the form of the congestion patterns 1, 2, or 3, the error pattern analysis unit 109 determines that the packet loss has occurred due to congestion.

That is, if errors occur at corresponding positions in the continuously transmitted groups, the error pattern analysis unit 109 determines that congestion occurs.

In this embodiment, there are three packet error patterns used by the error pattern analysis unit 109 to detect congestion. The congestion pattern 1 (201) is an error pattern that occurs in a relatively light congestion state. On the other hand, the congestion patterns 2 (202) and 3 (203) are error patterns that occur in a relatively heavy congestion state.

It may be determined whether these different types of congestion patterns have occurred on the basis of different criteria. For example, the congestion pattern 1 represents a relatively light congestion state as compared with the congestion pattern 2. Accordingly, a packet loss does not necessarily occur in all of a plurality of continuous groups. That is, in the case of the congestion pattern 1, in some of these continuous groups, an error may not occur. On the other hand, the congestion pattern 2 represents a heavy congestion state as compared with the congestion pattern 1. Accordingly, there is a high possibility that a packet loss occurs in all of a plurality of continuous groups. In this case, however, there may be variations in the position of occurrence of a packet loss in these continuous groups. Therefore, for example, if a pattern in which one or more continuous packets including the last packet are discarded in a group occurs a predetermined number of times or more for a predetermined period (or in a predetermined number of groups), it is determined that the congestion pattern 1 has occurred. On the other hand, if a pattern in which a certain number of continuous packets are discarded after a certain number of continuous packets including the first packet have been correctly received in a group continuously occurs a predetermined number of times or more, it is determined that the congestion pattern 2 has occurred. Thus, different criteria used to determine the occurrence of a congestion pattern may be set for different types of congestion patterns.

The number of groups used to determine the occurrence of a congestion pattern may be set in accordance with the type of a congestion pattern or a criterion used for the determination of occurrence of a congestion pattern. For example, if it is determined whether a congestion pattern occurs a predetermined number of times or more for a predetermined period (or in a predetermined number of groups) as a criterion for the determination of occurrence of the congestion pattern 1, a relatively many groups are referred to. On the other hand, if it is determined whether a packet loss satisfying predetermined conditions occurs in all of continuous groups as a criterion for the determination of occurrence of the congestion pattern 2, a smaller number of groups than the number of groups used for the determination of occurrence of the congestion pattern 1 may be referred to. Consequently, the analysis of an error pattern can be more effectively performed.

As described previously, in this embodiment, the number of packets included in a group varies in accordance with the type of frame. That is, for example, the number of packets included in an I-frame group is large, and the number of packets included in a B-frame or P-frame group is relatively small. Accordingly, in an I-frame group, a packet loss occurs near the end of the group. However, since the number of continuously transmitted packets is small in a B-frame group, a packet loss may not occur. Accordingly, for example, the error pattern analysis unit 109 may specify the positions of discarded packets using only I-frame groups and determine the pattern of a packet loss on the basis of the specified positions of the discarded packets. That is, for example, if the above-described error patterns (the congestion pattern 1, 2, and 3) occur a predetermined number of times or more in a predetermined number of I-frame groups, the error pattern analysis unit 109 may determine that a packet loss has occurred due to congestion. If these error patterns occur in a predetermined number of continuous I-frame groups or more, the error pattern analysis unit 109 may determine that a packet loss has occurred due to congestion.

That is, if the number of packets varies from group to group and errors occur at corresponding positions in a plurality of groups each including a predetermined number of packets or more, the error pattern analysis unit 109 may determine that congestion has occurred.

Consequently, even if the number of packets varies from group to group, the detection of congestion can be more accurately performed.

The error pattern analysis unit 109 according to this embodiment specifies the position of each discarded packet in a group so as to determine an error pattern. At that time, the error pattern analysis unit 109 refers to the sequence number of the discarded packet, and the first sequence number 501 and the continuously transmitted packet number 502 which are stored in the transmission positional information storage unit 106 so as to specify the position of the discarded packet in a group.

However, the error pattern analysis unit 109 may specify the number of packets from the first packet to each discarded packet in a group instead of the position of the discarded packet in the group. That is, the error pattern analysis unit 109 can specify the number of packets from the first packet to each discarded packet in a group on the basis of the sequence number of the discarded packet and the first sequence number 501 stored in the transmission positional information storage unit 106. If the specified numbers of packets from the first packet to each discarded packet in a plurality of continuously transmitted groups are the same, the error pattern analysis unit 109 determines that a packet loss has occurred due to congestion. At that time, if the specified numbers of packets are small, the error pattern analysis unit 109 may determine that heavy congestion has occurred. The reason for this is that it can be determined that the number of packets correctly received by an intermediary apparatus such as a router among continuously transmitted packets is small when a packet discarded due to congestion is on the side of the first packet. Thus, the determination of an error pattern can be performed with a small amount of information.

Next, the analysis of an error pattern other than the congestion pattern will be described with reference to FIG. 3. Like FIG. 2, FIG. 3 is a diagram illustrating the position of a discarded packet in a group. For example, FIG. 3 illustrates an exemplary case in which pieces of packetized moving image data are continuously transmitted on a frame-by-frame basis.

Referring to FIG. 3, a random pattern 301 is a pattern in which a packet loss randomly occurs in each of continuously transmitted groups. That is, in the case of the random pattern 301, the positions of error packets in one of these continuously transmitted groups do not correspond to those in the other ones of these groups. Furthermore, in the random pattern 301, a predetermined number of continuous error packets or more are not present.

If this error pattern occurs a predetermined number of times or more for a predetermined period (or in a predetermined number of groups), the error pattern analysis unit 109 determines that a packet loss having the random pattern 301 has occurred. If this error pattern occurs in a predetermined number of continuous groups or more, the error pattern analysis unit 109 determines that a packet loss having the random pattern 301 has occurred. On that other hand, a burst pattern 302 is a pattern in which a plurality of packets are continuously discarded in each of continuously transmitted groups, and is different from the above-described error patterns representing congestion.

That is, in the case of the burst pattern 302, the positions of error packets in one of these continuously transmitted groups do not correspond to those in the other ones of these groups. Furthermore, in the burst pattern 302, a predetermined number of continuous error packets or more are present.

If this error pattern occurs a predetermined number of times or more for a predetermined period (or in a predetermined number of groups), the error pattern analysis unit 109 determines that a packet loss having the burst pattern 302 has occurred. If this error pattern occurs in a predetermined number of continuous groups or more, the error pattern analysis unit 109 determines that a packet loss having the burst pattern 302 has occurred.

Thus, the error pattern analysis unit 109 classifies error patterns other than the error patterns representing congestion into the random pattern 301 and the burst pattern 302. That is, if the positions of error packets in one of continuously transmitted groups do not correspond to those in the other ones of these groups, the error pattern analysis unit 109 determines that a packet loss has occurred due to another factor other than congestion.

In order to classify error patterns into the random pattern 301 and the burst pattern 302, the error pattern analysis unit 109 determines whether the number of continuous error packets is larger than a threshold value. The threshold value may be optionally set. The error pattern analysis unit 109 may classify error patterns on the basis of an average of the numbers of continuous error packets in a plurality of groups or the maximum number of error packets in a plurality of groups.

The error pattern analysis unit 109 also receives a packet loss rate as the reception information. However, the error pattern analysis unit 109 may calculate the packet loss rate using the number of transmitted packets and the number of discarded packets.

If the error pattern analysis unit 109 according to this embodiment detects a plurality of error patterns in an error pattern analysis section, the error pattern analysis unit 109 calculates a packet loss rate of each of these error patterns. That is, the error pattern analysis unit 109 calculates a packet loss rate of each of the congestion patterns, the random pattern, and the bust pattern.

For example, it is assumed that the number of transmitted packets in an error pattern analysis section analyzed by the error pattern analysis unit 109 is 100 packets and the error pattern analysis unit 109 determines that 8 packets are discarded in the form of the congestion pattern and 2 packets are discarded in the form of the random pattern 301. In this case, the error pattern analysis unit 109 calculates a packet loss rate for each error pattern, so that a packet loss rate of 8% for the congestion pattern and a packet loss rate of 2% for the random pattern are calculated.

As described previously, if the positions of discarded packets in one of a plurality of continuously transmitted groups correspond to those in the other ones of these groups, the error pattern analysis unit 109 determines that these packets have been discarded in the form of the congestion pattern. If the positions of discarded packets in one of a plurality of continuously transmitted groups do not correspond to those in the other ones of these groups, the error pattern analysis unit 109 determines that these packets have been discarded in the form of the random pattern or the burst pattern. Furthermore, in order to determine which of the random pattern and the burst pattern is the error pattern of these discarded packets, the error pattern analysis unit 109 checks the number of continuous discarded packets.

Next, a QoS control method performed by the QoS control unit 110 that has received an error pattern analysis result from the error pattern analysis unit 109 will be described with reference to FIG. 8.

Figure 8:
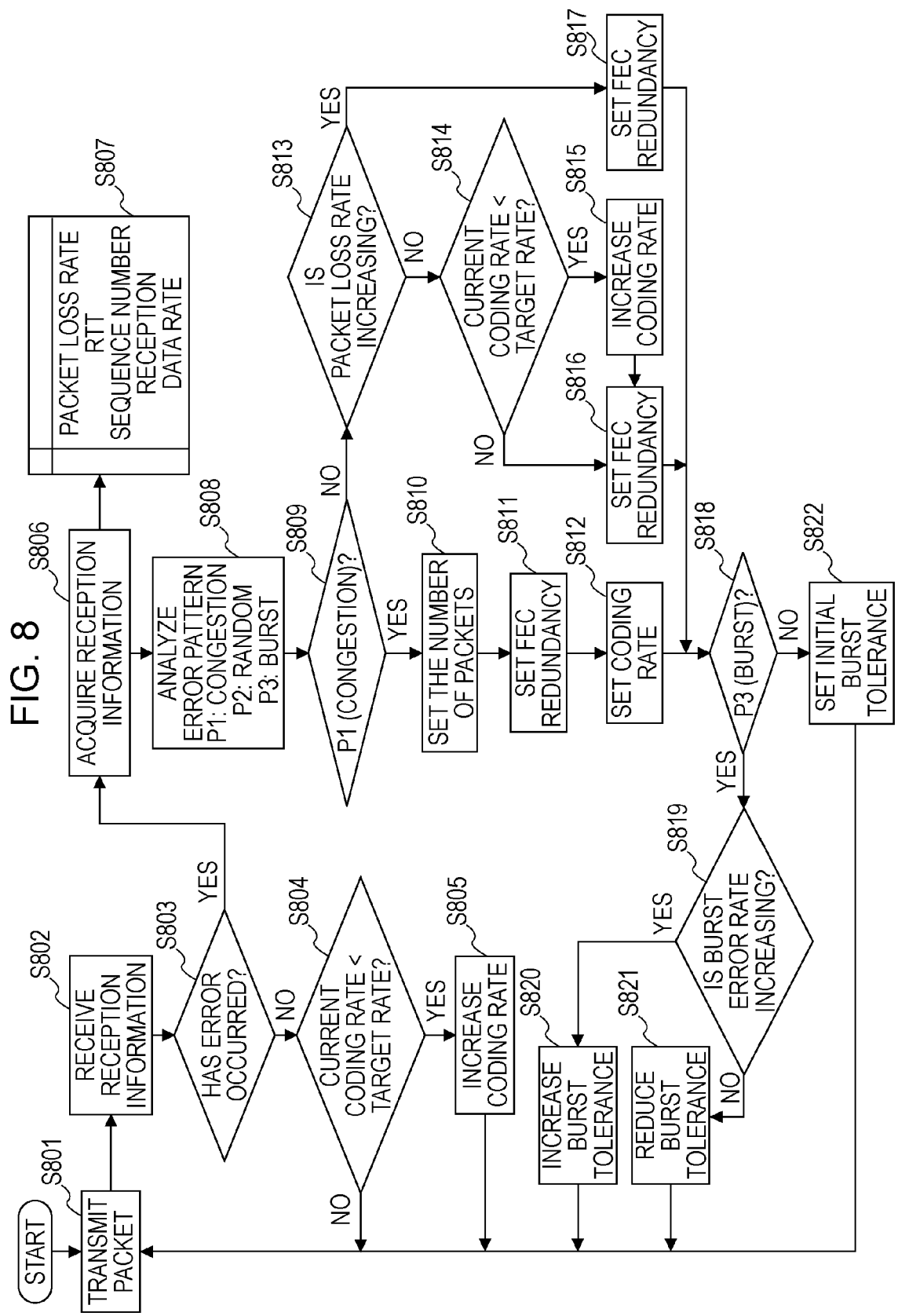
FIG. 8 is a flowchart illustrating a control process performed in the transmission apparatus illustrated in FIG. 1.

FIG. 8 is a flowchart illustrating a data transmission process performed by the transmission apparatus 100 according to this embodiment.

First, the transmission/reception unit 107 included in the transmission apparatus 100 transmits packets to a receiving apparatus via the transmission line 112 in step S801.

The transmission/reception unit 107 receives a reception information packet, that is, the reception information illustrated in FIG. 4, from the receiving apparatus in step S802.

That is, the transmission/reception unit 107 receives the reception information (the reception information packet) representing the reception status of the packets from a communication partner (the receiving apparatus) in step S802 (reception processing).

Upon receiving the reception information packet, the transmission/reception unit 107 notifies the error pattern analysis unit 109 of the reception information. The reception information transmitted from the transmission/reception unit 107 to the error pattern analysis unit 109 includes the sequence numbers of discarded packets. Upon receiving the reception information, the error pattern analysis unit 109 determines whether a communication error has occurred in step S803.

If the error pattern analysis unit 109 determines in step S803 that no error has occurred (No in step S803), the error pattern analysis unit 109 notifies the QoS control unit 110 of the fact. The QoS control unit 110 compares a current coding rate with a target rate set in advance in step S804. The coding rate is a transmission rate of data packets (for example, video data packets) to be transmitted per unit time. If the QoS control unit 110 determines in step S804 that the current coding rate does not reach the target rate (Yes in step S804), the QoS control unit 110 increases the coding rate at a predetermined rate in step S805. For example, the reason why it is determined in step S804 that the current coding rate does not reach the target rate is that data of one frame cannot be transmitted using a single group and is transmitted using a plurality of groups. In this case, in step S805, the QoS control unit 110 increases the number of data packets to be transmitted in each group. As a result, for example, even in a case that data of one frame is divided into five groups for transmission, the data can be transmitted using three groups. The transmission interval between groups is not changed even if the number of packets in each group is changed. The transmission interval between groups is the interval from when the last packet in a certain group A is transmitted to when the first packet in a group B next to the group A is transmitted. On the other hand, if the QoS control unit 110 determines in step S804 that the current coding rate reaches the target rate (No in step S804), the current coding rate is not changed and the process returns to step S801.

If the error pattern analysis unit 109 determines in step S803 that a communication error has occurred (Yes in step S803), the error pattern analysis unit 109 reads out the reception information in step S806 and stores the reception information in a memory in step S807. The reception information stored in the memory by the error pattern analysis unit 109 includes the sequence numbers of discarded packets and a packet loss rate. As described previously with reference to FIG. 4, the packet loss rate is the percentage of packets discarded on the communication path and bit-error packets (discarded packets) to transmitted packets.

The error pattern analysis unit 109 analyzes an error pattern in step S808. As described previously, the error pattern analysis unit 109 specifies the position of each discarded packet in a group on the basis of the discarded packet sequence number 403, the first sequence number 501, and the continuously transmitted packet number 502. The discarded packet sequence number 403 is transmitted from the transmission/reception unit 107 to the error pattern analysis unit 109, and the first sequence number 501 and the continuously transmitted packet number 502 are stored in the transmission positional information storage unit 106. As described previously with reference to FIGS. 2 and 3, the error pattern analysis unit 109 analyzes an error pattern on the basis of specified positions of discarded packets. That is, in step S808, the error pattern analysis unit 109 specifies the position of each error packet in a group on the basis of the reception information. As described previously, the error pattern analysis unit 109 determines in step S808 whether the analyzed error pattern is the congestion pattern (P1), the random pattern (P2), or the burst pattern (P3). If the error pattern analysis unit 109 detects a plurality of error patterns, the error pattern analysis unit 109 calculates a packet loss rate of each of these error patterns. The error pattern analysis unit 109 notifies the QoS control unit 110 of the analysis result of the error pattern in step S808.

Upon receiving the analysis result of the error pattern, the QoS control unit 110 determines whether the detected error patterns include the congestion pattern (P1) in step S809. The congestion pattern (P1) includes the congestion pattern 1 (201), the congestion pattern 2 (202), and the congestion pattern 3 (203) illustrated in FIG. 2. If the QoS control unit 110 determines in step S809 that the detected error patterns include the congestion pattern (P1) (Yes in step S809), the QoS control unit 110 sets the number of packets in each group so as to avoid the congestion state in step S810.

More specifically, for example, if the QoS control unit 110 determines in step S809 that the detected error patterns include the congestion pattern (P1), the QoS control unit 110 reduces the number of packets included in each of continuously transmitted packet groups. That is, for example if the fifth packet is discarded in each of a plurality of continuously transmitted packet groups, the QoS control unit 110 sets the maximum number of packets in each group to 4. That is, if the number of packets of a single frame exceeds the maximum number of packets in each group set by the QoS control unit 110, the QoS control unit 110 divides data of the frame into a plurality of groups for transmission so as to prevent the number of packets in each group from exceeding the maximum number of packets in each group. The method of setting the number of packets in each group is not limited to the above-described method.

The number of packets in each group set in step S810 by the QoS control unit 110 is the number of packets obtained by adding the number of FEC packets (FEC rate) to the number of data packets (for example, video data packets) (coding rate).

If the positions of discarded packets in one of a plurality of continuously transmitted groups correspond to those in the other ones of these groups, the error pattern analysis unit 109 according to this embodiment determines that a packet loss has occurred due to congestion.

That is, if errors occur at corresponding positions in a plurality of continuously transmitted groups, the QoS control unit 110 reduces the number of packets in each group.

If a group is divided into a group A and a group B, the interval from when the last packet in the group A is transmitted to when the first packet in the group B next to the group A is transmitted becomes longer. Accordingly, after reducing the number of packets in each group, the QoS control unit 110 resets the transmission interval between groups so that the transmission interval between groups set before the reduction in the number of packets in each group can be maintained. If the QoS control unit 110 increases the number of packets in each group, the transmission interval between groups set before the increase in the number of packets in each group is maintained.

In step S811, the QoS control unit 110, which has set the number of packets in each group in step S810, sets FEC redundancy on the basis of the packet loss rate of the random pattern (P2) or the burst pattern (P3) that is an error to be corrected by FEC. The QoS control unit 110 according to this embodiment sets the type of FEC on the basis of the cause of an error, that is, the random pattern (P2) or the bust pattern (P3) in step S811. In the case of the random pattern (P2), a predetermined number of continuous discarded packets or more are not present. Accordingly, in the case of a packet loss having the random pattern (P2), the QoS control unit 110 divides data packets included in each group into a plurality of sub-groups of packets to be continuously transmitted, and generates an FEC packet for each of these sub-groups. On the other hand, in the case of the burst pattern (P3), continuous discarded packets are present. Accordingly, in the case of a packet loss having the burst pattern (P3), the QoS control unit 110 divides data packets included in each group into a plurality of sub-groups of packets to be discontinuously transmitted, and generates an FEC packet for each of these sub-groups. For example, if nine data packets in a single group are transmitted and three FEC packets are added to the nine data packets, the QoS control unit 110 sets the FEC packets in accordance with the cause of an error. That is, in the case of the random pattern, the QoS control unit 110 divides these nine packets into a sub-group of first to third data packets, a sub-group of fourth to sixth data packets, and a sub-group of seventh to ninth data packets, and generates an FEC packet for each of these sub-groups. As a result, even if one of data packets included in each of the sub-groups is discarded, the discarded packet can be recovered using the FEC packet. On the other hand, in the case of the burst pattern, the QoS control unit 110 divides these nine packets into a sub-group of first, fourth and seventh data packets, a sub-group of second, fifth, and eighth data packets, and a sub-group of third, sixth, and ninth data packets, and generates an FEC packet for each of these sub-groups. As a result, even if one of data packets included in each of the sub-groups is discarded, the discarded packet can be recovered using the FEC packet. Thus, QoS control can be achieved by performing FEC in accordance with the cause of an error.

The QoS control unit 110 notifies the error correction coding unit 103 of the FEC redundancy. As described previously, the FEC packet is data to be transmitted to a communication partner (receiving apparatus) so as to allow the communication partner to correct an error included received packets using it. As described previously, the redundancy represents the ratio of the number of FEC packets to the number of data packets.

Thus, if it is determined in step S809 that the detected error patterns include the congestion pattern (P1) (Yes in step S809), the QoS control unit 110 sets the number of packets included in each group. In step S810, the QoS control unit 110 sets the FEC redundancy on the basis of the packet loss rate of the random pattern (P2) or the burst pattern (P3).

In step S812, the QoS control unit 110 sets the number of data packets (coding rate) by subtracting the number of FEC packets corresponding to the FEC redundancy set in step S811 from the number of packets included in each group which has been set in step S810, and notifies the rate control unit 111 of the coding rate. As described previously, the coding rate is a transmission rate of data packets (for example, video data packets).

On the other hand, if it is determined in step S809 that the detected error patterns do not include the congestion pattern (P1) (No in step S809), the QoS control unit 110 determines whether the packet loss rate is increasing in step S813. As described previously with reference to FIG. 4, the packet loss rate represents the percentage of packets discarded on the communication path and bit-error packets (discarded packets) to transmitted packets. The packet loss rate is included in the reception information transmitted from the transmission/reception unit to the error pattern analysis unit 109, and is stored in the memory by the error pattern analysis unit 109 in step S807.

If the QoS control unit 110 determines in step S813 that the packet loss rate is not increasing (No in step S813), the QoS control unit 110 determines whether the current coding rate reaches the target rate in step S814. If the QoS control unit 110 determines that the current coding rate does not reach the target rate (Yes in Step S814), the QoS control unit 110 increases the coding rate at a predetermined rate and notifies the rate control unit 111 of the increased coding rate in step s815. The coding rate is a transmission rate of data packets (for example, video data packets) to be transmitted per unit time. For example, the reason why it is determined in step S814 that the current coding rate does not reach the target rate is that data of one frame cannot be transmitted using a single group and is transmitted using a plurality of groups. That is, if it is determined in step S809 that congestion occurs, the QoS control unit 110 sets the coding rate so as to prevent the occurrence of a packet loss due to congestion. If the data of one frame is transmitted using a plurality of groups in accordance with the coding rate set by the QoS control unit 110, there are the transmission intervals between these groups. As a result, a coding rate decreases and may not reach the target rate.

On the other hand, in step S815, since a packet loss does not occur due to congestion and the packet loss rate of a packet loss caused due to another factor other than congestion is not increasing, the QoS control unit 110 increases the data packet transmission rate so that it is not lower than the target rate or is close to the target rate. As a result, for example, even in a case that data of one frame is divided into five groups for transmission, the data can be transmitted using three groups. The transmission interval between groups is not changed even if the number of packets in each group is changed. The transmission interval between groups is the interval from when the last packet in a certain group A is transmitted to when the first packet in a group B next to the group A is transmitted. Thus, the QoS control unit 110 increases the number of data packets to be transmitted per unit time.

That is, if the QoS control unit 110 determines in step S814 that the current coding rate does not reach the target rate (Yes in step S814), the QoS control unit 110 increases the number of packets included in each of packet groups to be continuously transmitted.

Like in the case of step S811, in step S816, the QoS control unit 110 sets the FEC redundancy on the basis of the packet loss rate of the random pattern (P2) or the burst pattern (P3), and notifies the error correction coding unit 103 of the FEC redundancy.

On the other hand, if the QoS control unit 110 determines in step S814 that the current coding rate reaches the target rate (No in step S814), the process proceeds to step S816. In step S816, as described previously, the QoS control unit 110 sets the FEC redundancy on the basis of the packet loss rate of the random pattern (P2) or the burst pattern (P3), and notifies the error correction coding unit 103 of the FEC redundancy. That is, in step S816, the QoS control unit 110 sets the FEC redundancy on the basis of the packet loss rate of an error pattern other than the congestion pattern. The FEC packet is data to be transmitted to a communication partner (receiving apparatus) so as to allow the communication partner to correct an error included in received packets using it. The redundancy represents the ratio of the number of FEC packets to the number of data packets.

If the QoS control unit 110 determines in step S813 that the packet loss rate is increasing (Yes in step S813), like in the case of step S816, the QoS control unit 110 sets the FEC redundancy and notifies the error correction coding unit 103 of the FEC redundancy in step S817.

That is, in the process from step S810 to step S817 (setting process), the QoS control unit 110 performs the following setting processing on the basis of the positions of error packets. That is, the QoS control unit 110 performs at least one of the settings of the number of packets included in each group and the number of pieces of data to be transmitted to a communication partner (receiving apparatus) so as to allow the communication partner to correct an error included in received packets using it.

If errors occur at corresponding and non-corresponding positions in a plurality of continuously transmitted groups, the QoS control unit 110 reduces the number of packets in each group and increases the FEC redundancy. The FEC redundancy is the ratio of the number of pieces of data (FEC data) to the number of data packets. These pieces of data (FEC data) are transmitted to a communication partner so as to allow the communication partner to correct an error included in received packets using them.

In step S818, the QoS control unit 110 determines whether the analyzed error patterns include the burst pattern (P3).

If the QoS control unit 110 determines in step S818 that the analyzed error patterns include the burst pattern (P3) (Yes in step S818), the QoS control unit 110 determines whether a burst error rate is increasing in step S819. The burst error rate represents a packet loss rate of the burst pattern (P3) which is one of packet loss rates of error patterns calculated by the error pattern analysis unit 109. If the QoS control unit 110 determines in step S819 that the burst error rate is increasing (Yes in step S819), the QoS control unit 110 increases a burst tolerance in step S820. If the QoS control unit 110 determines in step S819 that the burst error rate is not increasing (No in step S819), the QoS control unit 110 reduces the burst tolerance in step S821. That is, for example, if the burst error rate calculated this time is higher than the last calculated burst error rate, the QoS control unit 110 increases the burst tolerance. For example, if the burst error rate calculated this time is lower than the last calculated burst error rate, the QoS control unit 110 reduces the burst tolerance.

Examples of a concrete method of improving the burst tolerance performed by the QoS control unit 110 include a method of changing the transmission sequence of packets. That is, if the number of continuous error packets is larger than a predetermined number, the QoS control unit 110 controls the transmission sequence of packets so as to prevent the transmission sequence of packets from being the same as the reproduction sequence of the packets.

As the method of improving the burst tolerance, a method of generating an FEC packet using data packets included in different frames may be used. The QoS control unit 110 can improve the burst tolerance using such a method. However, if the burst tolerance is improved, real-timeness may not be assured. If the burst error rate is decreasing, it is desirable that the burst tolerance be reduced and the real-timeness be improved. Accordingly, if the analyzed error patterns do not include the burst pattern (P3) in step S818, the burst tolerance is reset to an initial level to improve real-timeness in step S822. That is, if the burst tolerance is reduced in step S822, the QoS control unit 110 does not change the transmission sequence of packets and generates an FEC packet using data packets included in the same frame. As a result, if the burst pattern does not occur, the burst tolerance can be reduced and real-timeness can be improved.

As described previously, a transmission apparatus according to this embodiment classifies the packet loss rates in accordance with the type of a communication error pattern. In the case of a communication error caused by congestion, the transmission apparatus controls the number of packets in each group so as to avoid the occurrence of the communication error. In the case of a communication error caused by another factor other than congestion, the transmission apparatus causes the receiving apparatus to restore a packet by FEC. Especially if the packet loss rate of the burst error pattern is changed, the transmission apparatus changes the burst tolerance. Thus, a transmission apparatus according to this embodiment can perform QoS control in accordance with the cause of a communication error.

For example, RTCP (RTP Control Protocol) is used for the reception information packet received from the receiving apparatus in step S802. In RTCP, data such as the reception information according to this embodiment is called receiver report.

This receiver report is generally transmitted at relatively short intervals, and includes information obtained for a relatively short period. Accordingly, if control processing is performed using only a single receiver report, the number packets in each group and the FEC redundancy vary widely each time the control processing is performed. If the number of packets in each group varies at short intervals, a packet transmission rate varies widely at short intervals.

At the time of the settings of the number of packets in each group and the FEC redundancy, it is desirable that the QoS control unit 110 minimize the variations by performing statistical processing using the past information stored in step S807 in the memory. Examples of the past information used for the statistical processing include the packet loss rate of each error pattern. That is, as described previously with reference to FIG. 8, in step S810, the QoS control unit 110 sets the number of packets in each group on the basis of the packet loss rate of the congestion pattern, and sets the FEC redundancy on the basis of the packet loss rate of the random pattern or the burst pattern. For example, if the QoS control unit 110 calculates the packet loss rate of the congestion pattern each time the receiver report is received and changes the number of packets in each group on the basis of the calculation result, the number of packets in each group may vary widely. The QoS control unit 110 minimizes the variation in the number of packets in each group using the past packet loss rate of the congestion pattern.

Examples of a concrete method of minimizing the variation in the number of packets in each group using the past packet loss rate which is performed by the QoS control unit 110 include a method of taking the average of a packet loss rate of the congestion pattern which is calculated at the time of reception of a receiver report and a packet loss rate of the congestion pattern which is calculated using a predetermined number of past receiver reports. Alternatively, weight set in advance may be assigned to the past packet loss rate of the congestion pattern, and the average of a packet loss rate of the congestion pattern which is calculated at the time of reception of a receiver report and the weighted packet loss rate may be calculated. Alternatively, if the difference between a packet loss rate of the congestion pattern which is calculated at the time of reception of a receiver report and the last calculated packet loss rate of the congestion pattern is lower than a predetermined value, it may be determined that there is no change in the packet loss rate of the congestion pattern.

Examples of the past information used for the statistical processing include the number of packets in each group, the FEC redundancy, and the coding rate which have been used in the past. Using the number of packets in each group, the FEC redundancy, and the coding rate which have been used in the past, the QoS control unit 110 minimizes the variation in the number of packets in each group. Examples of a concrete method of minimizing the variation in the number of packets in each group using the number of packets in each group which has been used in the past include a method of taking the average of the number of packets in each group calculated at the time of reception of a receiver report and the number of packets in each group calculated using a predetermined number of receiver reports received in the past. Alternatively, weight set in advance may be assigned to the number of packets in each group calculated in that past, and the average of the number of packets in each group calculated at the time of reception of a receiver report and the number of packets in each group which has been weighted may be calculated. Alternatively, if the difference between the number of packets in each group calculated at the time of reception of a receiver report and the last calculated number of packets in each group is lower than a predetermined value, the number of packets in each group may not be changed.

Thus, the QoS control unit 110 minimizes the variations in the number of packets in each group and the FEC redundancy using the past information. As a result, the variation in the packet transmission rate at short intervals can be minimized.

On the other hand, if the weight assigned to the past information used for the statistical processing is increased, the speed of error prevention or rate recovery may become slower, for example, when a band is rapidly changed on a network.

Accordingly, in the case of a relatively light congestion state, the QoS control unit 110 according to this embodiment increases the weight assigned to the past information so as to minimize the variations in the number of packets in each group and the FEC redundancy. On the other hand, in the case of a relatively heavy congestion state, the QoS control unit 110 reduces the weight assigned to the past information (or does not refer to the past information). As a result, even if a band is rapidly changed, the speed of error prevention or rate recovery can be improved.

As described previously with reference to FIG. 2, the error pattern analysis unit 109 according to this embodiment detects three congestion patterns (P1), and can determine the level of congestion using these congestion patterns. That is, the congestion pattern 1 (201) is a congestion pattern that occurs in a relatively light congestion state, and the congestion pattern 2 (202) and the congestion pattern 3 (203) are congestion patterns that occur in a relatively heavy congestion state.

As described previously, the error pattern analysis unit 109 can determine the level of a congestion state on the basis of the positions of error packets. That is, if the positions of discarded packets in one of a plurality of continuously transmitted groups correspond to those in the other ones of these groups and the positions of the discarded packets are in the forward part of each of these groups, the error pattern analysis unit 109 may determine that the level of a congestion state is heavy.

However, a method of determining the level of a congestion state is not limited to the above-described method. For example, the QoS control unit 110 can determine the level of a congestion state on the basis of the number of packets discarded due to congestion.

Thus, by dynamically changing a method of calculating the number of packets in each group or the FEC redundancy on the basis of a detected congestion pattern, the setting of the number of groups in each group or the FEC redundancy can be performed in accordance with the level of congestion.

Figures 9, 10:
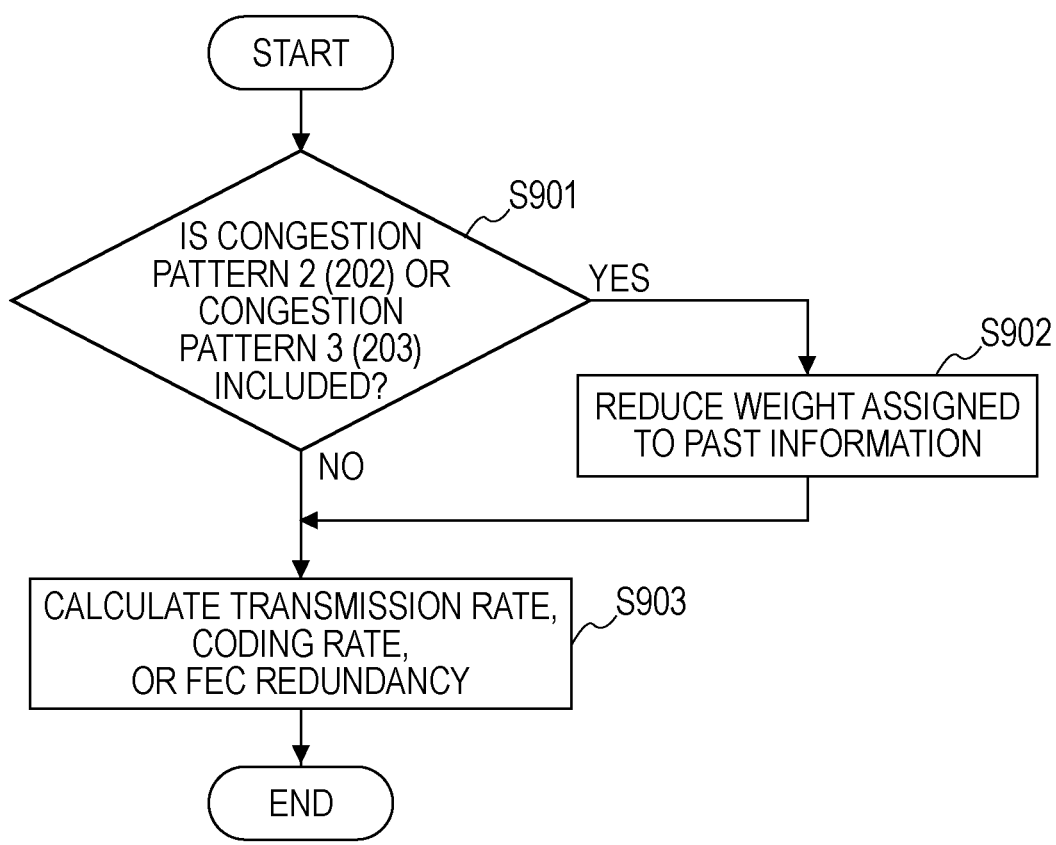
FIG. 9 is a flowchart illustrating a control process of dynamically changing a method of calculating the number of packets in each group or the redundancy.
FIG. 10 is a diagram illustrating a TCP throughput equation used to calculate an available network band.

The process of controlling weighting of the past information that is used by the QoS control unit 110 to set the number of packet in each group and the FEC redundancy on the basis of a detected congestion pattern will be described with reference to a flowchart illustrated in FIG. 9. Processing of step S901 illustrated in FIG. 9 is performed in step S810 illustrated in FIG. 8.

The QoS control unit 110, which has received the analysis result of an error pattern from the error pattern analysis unit 109, determines whether the detected error patterns include the congestion pattern 2 (202) or the congestion pattern 3 (203) in step S901. As described previously, the congestion pattern 2 (202) and the congestion pattern 3 (203) occur in a relatively heavy congestion state.

If the QoS control unit 110 determines in step S901 that the detected error patterns include one of these congestion patterns (Yes in step S901), the QoS control unit 110 reduces the weight assigned to the past information or does not refer to the past information in step S902. As a result, even if a band is rapidly changed, the speed of error prevention or rate recovery can be improved.

On the other hand, if the QoS control unit 110 determines in step S901 that the detected error patterns do not include the congestion pattern 2 (202) or the congestion pattern 3 (203) (No in step S901), the QoS control unit 110 assigns predetermined weight to the past information. The QoS control unit 110 calculates the number of packets in each group, a coding rate, and the FEC redundancy on the basis of the past information to which predetermined weight has been assigned and current information in step S903. As described previously, for example, the past information is a packet loss rate of each error pattern that has been calculated on the basis of a reception information packet (receiver report) representing the reception status of transmitted groups (the first groups). As the past information, for example, the number of packets in each group, the coding rate, and the FEC redundancy which have been used in the past may be used.

For example, the current information is the packet loss rate of each error pattern that has been calculated on the basis of a reception information packet (receiver report) representing the reception status of groups (the second groups) transmitted after the last transmitted groups (the first groups). As the current information, for example, the number of packets in each group, the coding rate, and the FEC redundancy which have been calculated at the time of reception of the receiver report representing the reception status of the groups transmitted after the last transmitted groups may be used.

That is, the transmission/reception unit 107 receives the first reception information representing the reception status of the first groups and the second reception information representing the reception status of the second groups transmitted after the first groups. In step S903, the QoS control unit 110 sets the number of packets in each of third groups to be transmitted after the second groups on the basis of the first reception information and the second reception information. The reception information according to this embodiment is the reception information packet (receiver report).

If the QoS control unit 110 determines in step S901 that the detected error patterns include the congestion pattern 2 or 3, the QoS control unit 110 reduces the weight assigned to the past information or does not refer to the past information. As described previously, the congestion patterns 2 and 3 occur in a relatively heavy congestion state. These congestion patterns are detected in a case that the first error packet is in forward part of each group. That is, if the position of the first error packet is a second position preceding a first position in each of the second groups, the QoS control unit 110 assigns weight to the first reception information which is lighter than that assigned to the first reception information when the position of the first error packet is the first position in each of these second groups. The QoS control unit 110 determines the number of packets in each of the third groups on the basis of the first reception information to which weight has been assigned and the second reception information. Thus, by dynamically changing a method of calculating the number of packets in each group or the FEC redundancy on the basis of a detected congestion pattern, the setting of the number of groups in each group or the FEC redundancy can be performed in accordance with the level of congestion.

The transmission apparatus 100 according to this embodiment estimates the cause of a communication error on the basis of the positions of discarded packets among continuously transmitted packets, and calculates a packet loss rate on the basis of the cause of the communication error. The transmission apparatus 100 selects and controls an appropriate QoS technique on the basis of the cause of the communication error. As a result, QoS control can be performed on the basis of the cause of the communication error.

A method of analyzing a communication error status on the basis of the communication error statuses of the data packets and the FEC packet which is performed by the error pattern analysis unit 109 has been described. However, another method of transmitting a dummy packet so as to check the quality of a network and analyzing a communication error status on the basis of the communication error status of the dummy packet may be used. In this case, the number of discarded data packets can be reduced.

Next, focusing attention on points different from the first embodiment, a second embodiment of the present invention will be described. In this embodiment, the receiving apparatus has an error pattern analysis function.

Figure 6:
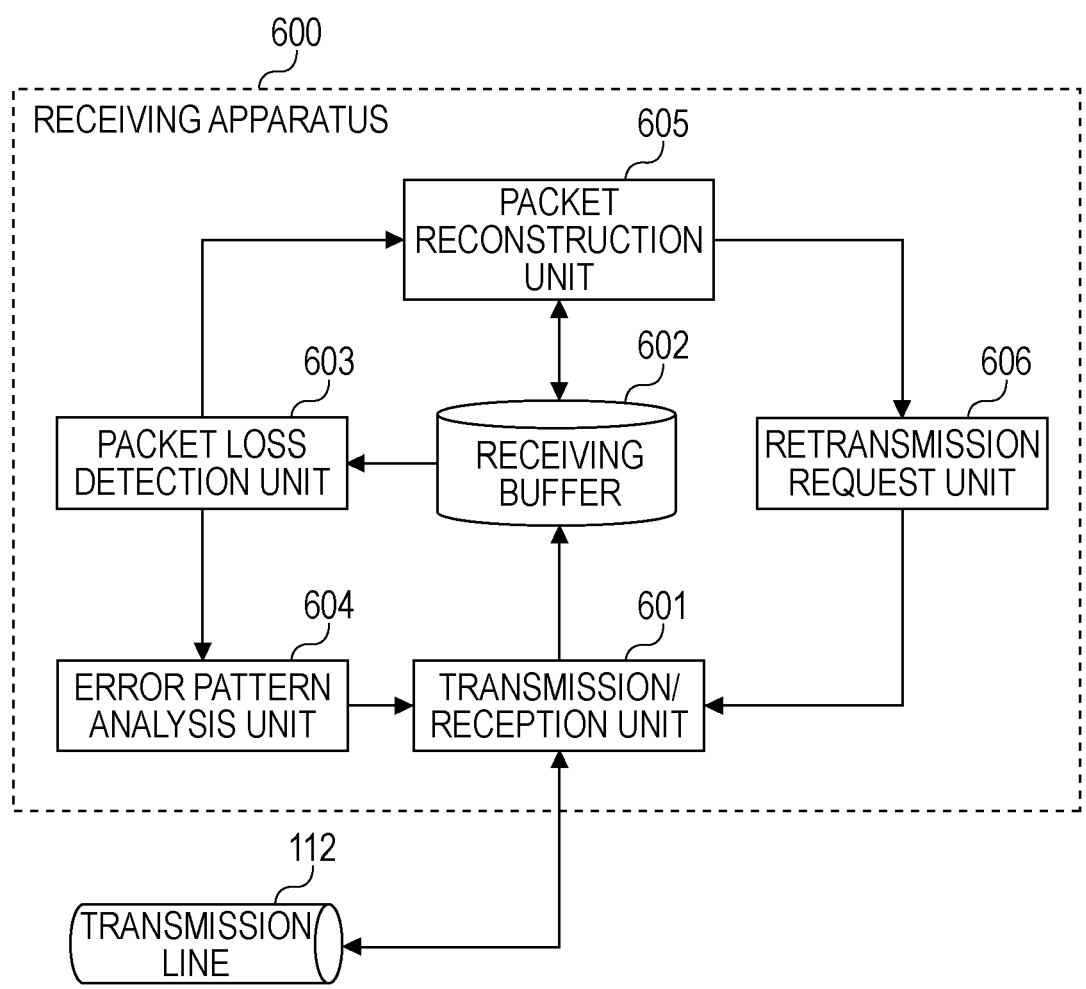
FIG. 6 is a block diagram illustrating a basic configuration of a receiving apparatus.

FIG. 6 is a block diagram illustrating a basic configuration of a receiving apparatus according to an embodiment of the present invention. A receiving apparatus 600 is an apparatus capable of receiving a plurality of packet groups between which a transmission waiting period is set, for example, a personal computer, a workstation, a notebook PC, a palmtop PC, a home appliance containing a computer, a game machine, a mobile telephone, a digital video camera, or a digital camera. The receiving apparatus may be composed of the combination of the above-described apparatuses.

As illustrated in FIG. 6, the receiving apparatus 600 includes a transmission/reception unit 601, a receiving buffer 602, a packet loss detection unit 603, an error pattern analysis unit 604, a packet reconstruction unit 605, and a retransmission request unit 606.

Figure 7:
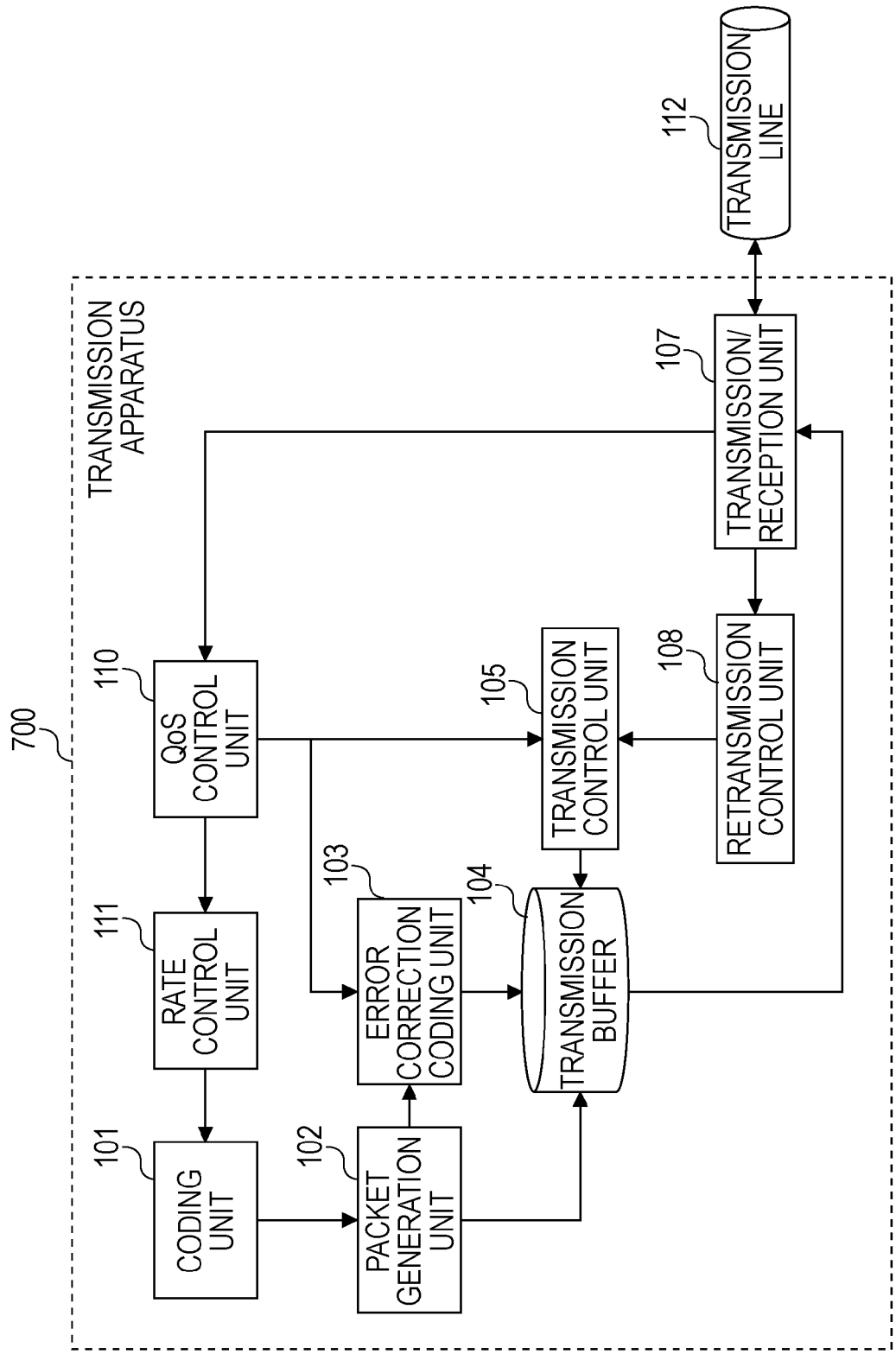
FIG. 7 is a block diagram illustrating a basic configuration of a transmission apparatus for transmitting data to the receiving apparatus illustrated in FIG. 6.

FIG. 7 is a block diagram of a transmission apparatus 700 for transmitting data to the receiving apparatus 600 according to this embodiment. The transmission apparatus 700 performs packet communication using RTP, and is an apparatus capable of sequentially transmitting a plurality of packets to a communication partner (receiving apparatus), for example, a personal computer, a workstation, a notebook PC, a palmtop PC, a home appliance containing a computer, a game machine, a mobile telephone, a digital video camera, or a digital camera. Alternatively, the transmission apparatus 700 may be composed of the combination of the above-described apparatuses.

The transmission/reception unit 601 has a function of transmitting/receiving a packet via the transmission line 112 such as a network. The transmission/reception unit 601 stores a received packet in the receiving buffer 602. The transmission/reception unit 601 transmits to the transmission apparatus 700 a reception information packet so as to notify the transmission apparatus 700 of the reception of a packet and a retransmission request packet so as to request the transmission apparatus 700 to retransmit a packet discarded on the communication path.

The packet loss detection unit 603 always monitors a sequence number in a header portion of each RTP packet stored in the receiving buffer 602. The packet loss detection unit 603 checks whether there is a dropout in sequence numbers so as to detect a packet discarded on the communication path.

If the packet loss detection unit 603 detects that a packet has been discarded, the packet loss detection unit 603 notifies the error pattern analysis unit 604 of the sequence number of the discarded packet. The packet loss detection unit 603 transmits to the error pattern analysis unit 604 information used to specify the position of the discarded packet in a group. The details of the information used to specify the position of the discarded packet will be described later.

The error pattern analysis unit 604 receives from the packet loss detection unit 603 a notification, performs the error pattern analysis illustrated in FIGS. 2 and 3, and calculates a packet loss rate of each error pattern.

In order to perform the error pattern analysis illustrated in FIGS. 2 and 3, the error pattern analysis unit 604 needs to identify the boundaries between continuously transmitted groups of packets. That is, in order to specify the position of a discarded packet in a group, the error pattern analysis unit 604 identifies the boundaries between groups. The transmission apparatus 700 according to this embodiment sets transmission intervals between groups. Accordingly, the receiving apparatus 600 can identify the boundaries between groups on the basis of the transmission intervals between received groups of packets.

However, in accordance with a network status, it is difficult for the receiving apparatus 600 to identify the boundaries between groups under the influence of jitter. In this embodiment, an extended area of an RTP header is used to identify the boundaries between groups.

In the format of an RTP header illustrated in FIG. 11, X 1101 represents a one-bit flag. This flag indicates that there is an extended area subsequent to an RTP fixed header.

Figure 12:
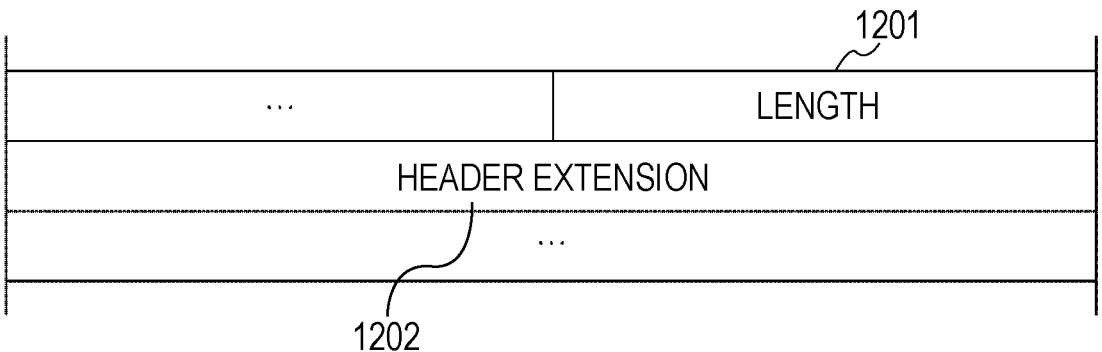
FIG. 12 is a diagram illustrating the format of an extended area of an RTP header.

FIG. 12 illustrates the format of the extended area of an RTP header. Length 1201 represents the size of the extended area, and header extension 1202 represents an area in which data of the extended area is stored.

Figure 13:
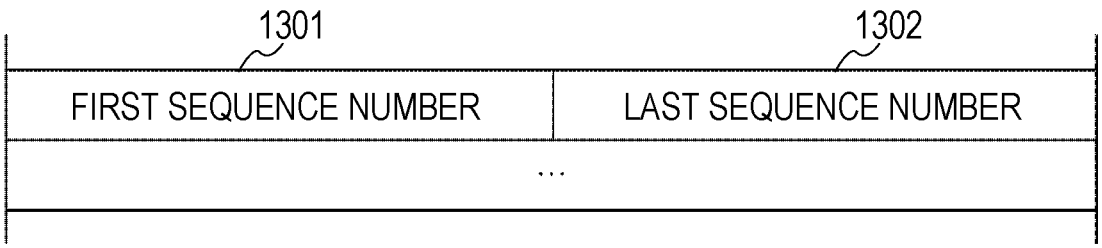
FIG. 13 is a diagram illustrating an example of use of an extended area of an RTP header.

FIG. 13 illustrates data stored in the header extension 1202. First sequence number 1301 represents the sequence number of the first packet in each of continuously transmitted packet groups, and last sequence number 1302 represents the sequence number of the last packet in each of the continuously transmitted packet groups.

That is, the transmission apparatus 700 according to this embodiment sets the flag represented by the X 1101 so as to use the extended area. As illustrated in FIG. 13, the transmission apparatus 700 records the sequence numbers of the first and last packets in each group. The transmission apparatus 700 adds pieces of information about the sequence numbers of the first and last packets to all of a plurality of packets included in the same group.

The error pattern analysis unit 604 can identify the first and last packets in each of the continuously transmitted groups of packets, that is, the boundaries between these groups, by referring to the added pieces of information about the sequence numbers of the first and last packets.

That is, the packet loss detection unit 603 acquires the sequence numbers of discarded packets by acquiring the sequence numbers of correctly received packets. The packet loss detection unit 603 acquires the sequence numbers of the first and last packets which are stored in the extended area for each of the correctly received packets.

That is, the packet loss detection unit 603 receives a packet including identification information identifying the position of the packet in a group, and acquires the identification information from the received packet.

The packet loss detection unit 603 notifies the error pattern analysis unit 604 of the sequence numbers of the discarded packets and the sequence numbers of the first and last packets in each group. The error pattern analysis unit 604 specifies the positions of the discarded packets in each group on the basis of these pieces of information transmitted from the packet loss detection unit 603.

That is, the error pattern analysis unit 604 specifies the positions of network error packets (discarded packets) among packets transmitted from the transmission apparatus on the basis of the identification information acquired from the packet loss detection unit 603. In this embodiment, the identification information includes the sequence numbers of correctly received packets and the sequence numbers of the first and last packets in a group which are recorded in an extended area of the header of a correctly received RTP packet.

As a result, for example, even if packets are discarded on a communication path or packets are transmitted at irregular intervals under the influence of jitter, the error pattern analysis unit 604 can identify the boundaries between continuously transmitted groups of packets. Accordingly, the error pattern analysis unit 604 can correctly perform the error pattern analysis. Like in the first embodiment, the error pattern analysis unit 604 performs the error pattern analysis. For example, if packet losses occur at corresponding positions in a plurality of continuously transmitted groups, the error pattern analysis unit 604 determines that these packet losses have occurred due to congestion.

That is, the error pattern analysis unit 604 determines whether the positions of network error packets (discarded packets) in one of a plurality of continuously transmitted groups correspond to those in the other ones of these groups, and detects a network status on the basis of the determination result.

The error pattern analysis unit 604 transmits the error pattern analysis result to the transmission apparatus 700 as a reception information packet (RTCP receiver report) via the transmission/reception unit 601 and the transmission line 112. That is, the transmission/reception unit 601 notifies the transmission apparatus 700 of the network status detected by the error pattern analysis unit 604.

The packet reconstruction unit 605 performs the reconstruction of the discarded packets using an FEC technique on the basis of the sequence numbers of the discarded packets transmitted from the packet loss detection unit 603. The packet reconstruction unit 605 notifies the retransmission request unit 606 of the identification information, for example, sequence number of a packet that has not been correctly reconstructed using the FEC technique.

The retransmission request unit 606 receives from the packet reconstruction unit 605 the identification information of the packet that has not bee correctly reconstructed, and transmits a retransmission request packet including the identification information to the transmission apparatus 700 via the transmission/reception unit 601 and the transmission line 112.

The difference between the configurations of the transmission apparatus 700 illustrated in FIG. 7 and the transmission apparatus 100 according to the first embodiment illustrated in FIG. 1 is that the transmission apparatus 700 does not include the transmission positional information storage unit 106 and the error pattern analysis unit 109. As a block corresponding to the error pattern analysis unit 109, the error pattern analysis unit 604 is included in the receiving apparatus 600. The error pattern analysis unit 109 according to the first embodiment specifies the positions of discarded packets in each group on the basis of the sequence numbers of the discarded packet, and the first sequence number and the continuously transmitted packet number which are stored in the transmission positional information storage unit 106. On the other hand, the error pattern analysis unit 604 specifies the positions of discarded packets in each group on the basis of the sequence numbers of the discarded packets and the sequence numbers of the first and last packets in each group which are stored in the extended area for the RTP header. Accordingly, like the error pattern analysis unit 109 according to the first embodiment, the error pattern analysis unit 604 can perform the error pattern analysis.

Accordingly, using an error pattern analysis result received from the receiving apparatus 600, the transmission apparatus 700 can also perform the QoS control process illustrated in FIG. 8 in accordance with the cause of a packet loss.

The present invention may be achieved in such a manner that a computer-readable storage medium storing a program code of software for implementing the functions of the above-described embodiments is supplied to a system or an apparatus, and a computer (or a CPU or MPU) of the system or apparatus reads out the program code from the storage medium and executes the read program code. In this case, a program code itself read out from the storage medium achieves the functions of the above-described embodiments. That is, the present invention also includes the storage medium storing the program code.

As the storage medium for providing a program code, for example, a flexible disk, a hard disk, an optical disc, a magneto-optical disk, a CD-ROM, a CD-R, a magnetic tape, a nonvolatile memory card, a ROM, or a DVD may be used.

The computer executes the read program code to achieve the functions of the above-described embodiments. Furthermore, an Operating System (OS) or the like running on the computer may perform part or all of actual processing under instructions of the program code to achieve the functions of the above-described embodiments.

Still furthermore, the program code read out from the storage medium may be written to a memory provided in a function expansion board inserted into the computer or in a function expansion unit connected to the computer. Subsequently, a CPU or the like provided in the function expansion board or the function expansion unit may perform part or all of actual processing under instructions of the program code so as to achieve the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications and equivalent structures and functions.

This application claims the benefit of Japanese Patent Application No. 2008-169329 filed Jun. 27, 2008, which is hereby incorporated by reference herein in its entirety.

What is claimed is:

1. A transmission apparatus for sequentially transmitting a plurality of packets to a communication partner, comprising:
    a transmission control unit configured to set a waiting period between transmission of a certain group of packets and transmission of a following group of packets;
    a reception unit configured to receive, from the communication partner, reception information representing a packet reception status; and
    a setting unit configured to specify, based on the reception information, a position of at least one error packet in the group of the plurality of packets, and to set, based on the specified position of the at least one error packet that corresponds to a transmission order of the at least one error packet on a transmission of the plurality of packets in the group the number of packets in a following group.

2. The transmission apparatus according to claim 1, wherein, if errors occur at corresponding positions in a plurality of continuously transmitted groups, the setting unit reduces the number of packets in following group.

3. The transmission apparatus according to claim 1, wherein, if a last transmitted packet is an error packet in each of a plurality of continuously transmitted groups, the setting unit reduces the number of packets in a following group.

4. The transmission apparatus according to claim 1, wherein, if a packet transmitted after a predetermined number of continuous packets including a first packet have been transmitted is an error packet in each of a plurality of continuously transmitted groups, the setting unit reduces the number of packets in a following group.

5. The transmission apparatus according to claim 1, wherein, if a predetermined percentage of packets or more to packets included in each of a plurality of continuously transmitted groups are error packets, the setting unit reduces the number of packets in a following group.

6. The transmission apparatus according to claim 1, further comprising a control unit configured to, if the number of continuous error packets is larger than a predetermined number, perform control processing so as to prevent a transmission sequence of following packets from being the same as a reproduction sequence of the following packets.

7. The transmission apparatus according to claim 1, wherein, if the number of packets differs from group to group and errors of a predetermined number of packets or more occur at corresponding positions in a plurality of groups, the setting units reduces the number of packets included in following groups.

8. The transmission apparatus according to claim 1,
    wherein the reception unit receives first reception information representing a reception status of a plurality of first groups and second reception information representing a reception status of a plurality of second groups transmitted after the plurality of first groups, and
    wherein the setting unit sets, based on the first reception information and the second reception information, the number of packets in each of a plurality of third groups to be transmitted after the plurality of second groups.

9. The transmission apparatus according to claim 8, wherein, if a position of a first error packet precedes a predetermined position in each of the plurality of second groups, the setting unit assigns a weight to the first reception information which is lighter than a weight assigned to the first reception information when the position of the first error packet is another position in each of the plurality of second groups, and sets, based on weighted first reception information and the second reception information, the number of packets in each of the plurality of third groups.

10. A transmission method of sequentially transmitting a plurality of packets to a communication partner, comprising:
    setting a waiting period between transmission of a certain group of packets and transmission of a following group of packets;
    receiving, from the communication partner, reception information representing a packet reception status; and
    specifying, based on the reception information, a position of at least one error packet in the group of the plurality of packets, and setting, based on the specified position of the at least one error packet that corresponds to a transmission order of the at least one error packet on a transmission of packets in the group, at least one of the number of packets in a following group and the number of pieces of correction data to be transmitted to the communication partner to allow the communication partner to correct an error included in received packets using the correction data.

11. A non-transitory computer-readable medium storing computer-executable instructions for causing a computer to perform a method of sequentially transmitting a plurality of packets to a communication partner, the method comprising:
    setting a waiting period between transmission of a certain group of packets and transmission of a following group of packets;
    receiving from the communication partner reception information representing a packet reception status; and
    specifying, based on the reception information, a position of at least one error packet in the group of the plurality of packets, and setting, based on the specified position of the at least one error packet that corresponds to a transmission order of the at least one error packet on a transmission of the plurality of packets in the group, at least one of the number of packets in a following group and the number of pieces of correction data to be transmitted to the communication partner to allow the communication partner to correct an error included in received packets using the correction data.

12. A transmission apparatus for sequentially transmitting a plurality of packets to a communication partner via a network, comprising:
    a transmission control unit configured to set a waiting period between transmission of a certain group of packets and transmission of a following group of packets;
    a reception unit configured to receive from the communication partner, reception information representing a packet reception status; and
    a determination unit configured to specify, based on the reception information, positions of error packets in a plurality of continuously transmitted groups of packets, determine whether the positions of the error packets are corresponding positions in the plurality of continuously transmitted groups, and detect a status of the network based on a determination result.

13. A receiving apparatus for receiving from a transmission apparatus via a network a plurality of packet groups between which a transmission waiting period is set, comprising:
    an acquisition unit configured to acquire, from each of received packets, identification information identifying a position of the packet in a packet group;

a determination unit configured to specify, based on the acquired identification information, positions of network error packets in a plurality of packet groups continuously transmitted from the transmission apparatus, determine whether the specified positions are corresponding positions in the plurality of packet groups, and detect a status of the network based on a determination result, and a notification unit configured to notify the transmission apparatus of the detected status of the network.

14. A transmission method of sequentially transmitting a plurality of packets to a communication partner via a network, comprising:

setting a waiting period between transmission of a certain group of packets and transmission of a following group of packets;

receiving from the communication partner, reception information representing a packet reception status; and specifying, based on the reception information, positions of error packets in a plurality of continuously transmitted groups of packets, determining whether the positions of the error packets are corresponding positions in the plurality of continuously transmitted groups, and detecting a status of the network based on a determination result.

15. A non-transitory computer-readable medium storing computer-executable instructions for causing a computer to perform a method of sequentially transmitting a plurality of packets to a communication partner via a network, the method comprising:

setting a waiting period between transmission of a certain group of packets and transmission of a following group of packets;

receiving from the communication partner, reception information representing a packet reception status; and specifying, based on the reception information, positions of error packets in a plurality of continuously transmitted groups of packets, determining whether the positions of the error packets are corresponding positions in the plurality of continuously transmitted groups, and detecting a status of the network based on a determination result.

16. A processing method performed by a receiving apparatus for receiving from a transmission apparatus via a network a plurality of packet groups between which a transmission waiting period is set, comprising:

acquiring, from each of received packets, identification information identifying a position of the packet in a packet group;

specifying, based on the acquired identification information, positions of network error packets in a plurality of packet groups continuously transmitted from the transmission apparatus, determining whether the specified positions are corresponding positions in the plurality of packet groups, and detecting a status of the network based on a determination result, and notifying the transmission apparatus of the detected status of the network.

17. A non-transitory computer-readable medium storing computer-executable instructions for causing a computer to perform a method of receiving, from a transmission apparatus via a network, a plurality of packet groups between which a transmission waiting period is set, the method comprising:

acquiring, from each of received packets, identification information identifying a position of the packet in a packet group;

specifying, based on the acquired identification information, positions of network error packets in a plurality of packet groups continuously transmitted from the transmission apparatus, determining whether the specified positions are corresponding positions in the plurality of packet groups, and detecting a status of the network based on a determination result, and notifying the transmission apparatus of the detected status of the network.

18. A transmission apparatus for sequentially transmitting a plurality of packets to a communication partner, comprising:

a transmission control unit configured to set a waiting period between transmission of a certain group of packets and transmission of a following group of packets;

a reception unit configured to receive, from the communication partner, reception information representing a packet reception status; and a setting unit configured to specify, based on the reception information, a position of at least one error packet in the group of the plurality of packets, and to set, based on the specified position of the at least one error packet that corresponds to a transmission order of the at least one error packet on a transmission of the plurality of packets in the group, the number of pieces of correction data to be transmitted to the communication partner to allow the communication partner to correct an error included in received packets.

19. The transmission apparatus according to claim 18, wherein data to be transmitted to the communication partner includes video data, and wherein, if a position of a first error packet in one of a plurality of continuously transmitted groups does not correspond to that of error packets in the other ones of the plurality of continuously transmitted groups, the setting unit increases the ratio of the number of pieces of correction data to the number of pieces of video data to be transmitted to the communication partner.

20. The transmission apparatus according to claim 18, wherein, if errors occur at non-corresponding positions in a plurality of continuously transmitted groups, the setting unit reduces the number of packets in a following group and increases the number of pieces of correction data to be transmitted to the communication partner so as to allow the communication partner to correct an error included in received packets using the correction data.

21. The transmission apparatus according to claim 18, wherein packets to be transmitted to the communication partner include packets for video data and packets for correction data, and wherein, if the last packet in each of a plurality of continuously transmitted groups is not an error packet, a packet transmitted after a predetermined number of continuous packets including the first packet have been transmitted in each of the plurality of continuously transmitted groups is not an error packet, and all packets in a certain group are not error packets, the setting unit increases the ratio of the number of pieces of the correction data to the number of pieces of video data to be transmitted to the communication partner.

* * * * *